United States Patent [19]
Kobayashi et al.

[11] Patent Number: 5,912,520
[45] Date of Patent: Jun. 15, 1999

[54] FEED-SCREW UNIT AND ELECTRIC MOTOR USING SAME

[75] Inventors: Yoshiyuki Kobayashi, Kanagawa; Minoru Suzuki, Tokyo; Hideaki Nakamura, Kanagawa; Yuzuru Morioka, Kanagawa; Toshiro Ichikawa, Kanagawa; Osamu Fujita, Kanagawa, all of Japan

[73] Assignee: Unisia Jecs Corporation, Atsugi, Japan

[21] Appl. No.: 08/818,103

[22] Filed: Mar. 13, 1997

[30] Foreign Application Priority Data

| Mar. 13, 1996 | [JP] | Japan | 8-056429 |
| Mar. 13, 1996 | [JP] | Japan | 8-056430 |
| Sep. 5, 1996 | [JP] | Japan | 8-235569 |

[51] Int. Cl.$^6$ .................................................. H02K 7/06
[52] U.S. Cl. ........................... 310/80; 310/83; 310/43; 310/254
[58] Field of Search ................................. 310/80, 83, 43, 310/254

[56] References Cited

U.S. PATENT DOCUMENTS

| 3,660,704 | 5/1972 | Paine et al. | 310/80 |
| 4,136,571 | 1/1979 | Frölichsthal | 74/89.15 |
| 4,751,411 | 6/1988 | Fukaya et al. | 310/49 |
| 5,517,070 | 5/1996 | Schmidt | 310/89 |
| 5,727,307 | 3/1998 | Gstohl et al. | 29/597 |

FOREIGN PATENT DOCUMENTS

| 1814994 | 7/1970 | Germany . |
| 24 06 201 | 8/1975 | Germany . |
| 3735517 A1 | 5/1988 | Germany . |
| 44 25 101 A1 | 2/1995 | Germany . |
| 4-108367 | 9/1992 | Japan . |
| 6-78494 | 3/1994 | Japan . |
| 906340 | 9/1962 | United Kingdom . |
| 958230 | 5/1964 | United Kingdom . |
| 1 260 704 | 1/1972 | United Kingdom . |
| 2 122 302 | 1/1984 | United Kingdom . |
| 2 280 652 | 2/1995 | United Kingdom . |

*Primary Examiner*—Nestor Ramirez
*Assistant Examiner*—Thanh Lam
*Attorney, Agent, or Firm*—Foley & Lardner

[57] ABSTRACT

A feed-screw unit includes a rotor formed with a female screw, and a reciprocating shaft disposed inside the rotor to be moved forward and backward in the axial direction of the rotor in accordance with rotation thereof. The reciprocating shaft includes a male screw with a first portion to be in engagement with the female screw of the rotor and a second portion to be in non-engagement therewith.

10 Claims, 29 Drawing Sheets

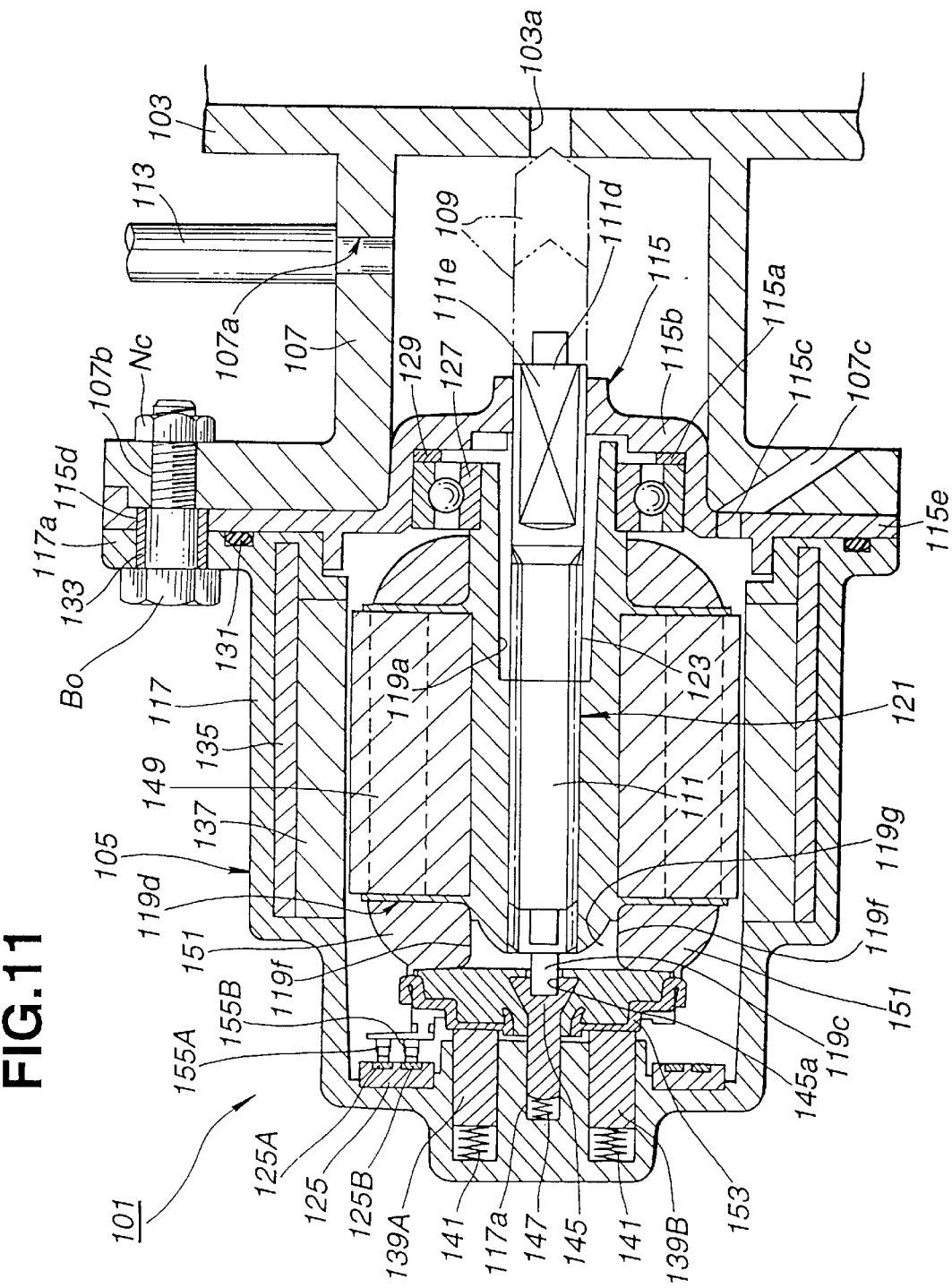

FEED-SCREW UNIT AND ELECTRIC MOTOR USING SAME

BACKGROUND OF THE INVENTION

The present invention relates to a feed-screw unit wherein a reciprocating shaft is reciprocated in accordance with rotation of a rotor, and a method of manufacturing the feed-screw unit. The present invention also relates to an electric motor using the feed-screw unit.

There is known a feed-screw unit wherein a reciprocating shaft is linearly reciprocated by using rotation of a rotor which receives torque. With the feed-screw unit which is used in electric motors as disclosed, e.g. in JP-U 4-108367, the rotor including a female screw is rotatably supported inside a stator coil arranged in a motor housing, whereas the reciprocating shaft including a male screw engaged with the female screw is arranged inside the rotor to axially extend along the rotor.

When the stator coil is controlled by a drive-pulse control signal provided, the rotor is rotated in one direction to move forward an end of the reciprocating shaft for positioning, or in another direction to move forward the end of the reciprocating shaft for positioning. When the rotor is made of a non-metallic material such as a plastic resin, and the reciprocating shaft is made of a metallic material such as steel, positional maintaining of the reciprocating shaft with high accuracy needs to appropriately preserve the mechanical strength of the female screw of the rotor, and to appropriately determine the accuracy of engagement of the female screw of the rotor with the male screw of the reciprocating shaft.

Due to the fact that the female screw of the rotor made of a plastic resin can contract in accordance with the characteristic thereof during cooling after forming, the inner diameter of the female screw should be determined with an appropriate clearance considering the dimension and the contraction coefficient of the male screw which forms a design basis.

Moreover, with manufacturing of the rotor, the reciprocating shaft is replaced with an insert shaft with a male screw in view of the mass-productivity, resulting in necessary consideration of wear of the insert shaft.

As described above, the dimension of the female screw of the rotor is determined considering dispersion of the contraction coefficient of the rotor, wear of the insert shaft, etc., enlarging an engagement clearance between the female screw of the rotor and the male screw of the reciprocating shaft, causing difficult maintaining of the high engagement accuracy. This results in impossible achievement of smooth reciprocation and feed position of the reciprocating shaft with high accuracy.

It is, therefore, an object of the present invention to provide a feed-screw unit wherein a reciprocating shaft is reciprocated in accordance with rotation of a rotor, which enables maintaining of engagement of the reciprocating shaft with the rotor with high accuracy. Another object of the present invention is to provide an electric motor using the feed-screw unit.

SUMMARY OF THE INVENTION

According to one aspect of the present invention, there is provided a feed-screw unit, comprising:

a rotor formed with a female screw; and a reciprocating shaft disposed inside said rotor, said reciprocating shaft being moved forward and backward in an axial direction of said rotor in accordance with rotation thereof, said reciprocating shaft including a male screw with a first portion to be in engagement with said female screw of said rotor and a second portion to be in non-engagement therewith.

Another aspect of the present invention lies in providing a method of manufacturing a feed-screw unit, comprising the steps of:

disposing a reciprocating shaft in a mold so that a male screw thereof has an axis corresponding to an axis of a rotor;

injecting a melted material into said mold; and cooling said melted material, whereby said rotor with a female screw is produced.

The other aspect of the present invention lies in providing, in an electric motor:

a rotor formed with a female screw;

a reciprocating shaft disposed inside said rotor, said reciprocating shaft being moved forward and backward in an axial direction of said rotor in accordance with rotation thereof, said reciprocating shaft including a male screw with a first portion to be in engagement with said female screw of said rotor and a second portion to be in non-engagement therewith;

a casing, said casing including bearings for rotatably supporting ends of said rotor and magnets disposed on an inner periphery thereof; and a rotor core disposed on an outer periphery of said rotor to face said magnets, said rotor core including a coil wound therearound.

Still another aspect of the present invention lies in providing, in an electric motor:

a rotor, said rotor including a shank;

a casing, said casing including bearings for rotatably supporting of said shank of said rotor and magnets disposed on an inner periphery thereof; and a rotor core disposed on an outer periphery of said rotor to face said magnets, said rotor core including a coil wound therearound, said shank of said rotor and said rotor core being integrated with each other.

BRIEF DESCRIPTION OF THE DRAWINGS

FIG. 11 is a view similar to FIG. 10C, showing an exhaust-gas-recirculation control valve with an exhaust passage;

DETAILED DESCRIPTION OF THE INVENTION

Figure 1:
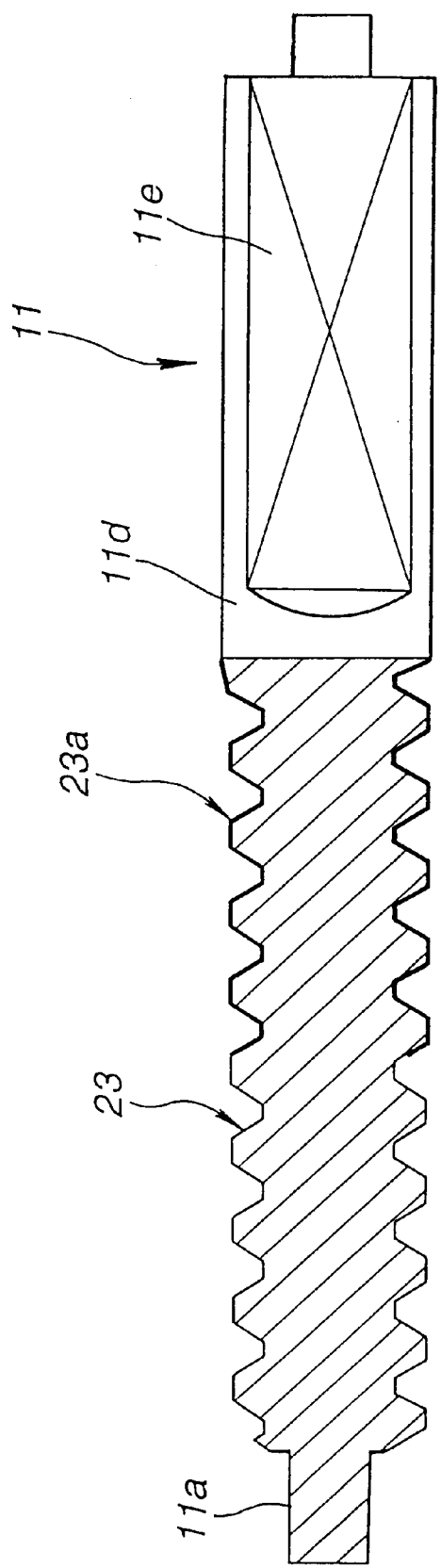
FIG. 1 is a longitudinal section showing a reciprocating shaft.

Referring to the drawings, a feed-screw unit embodying the present invention will be described.

Figure 2:
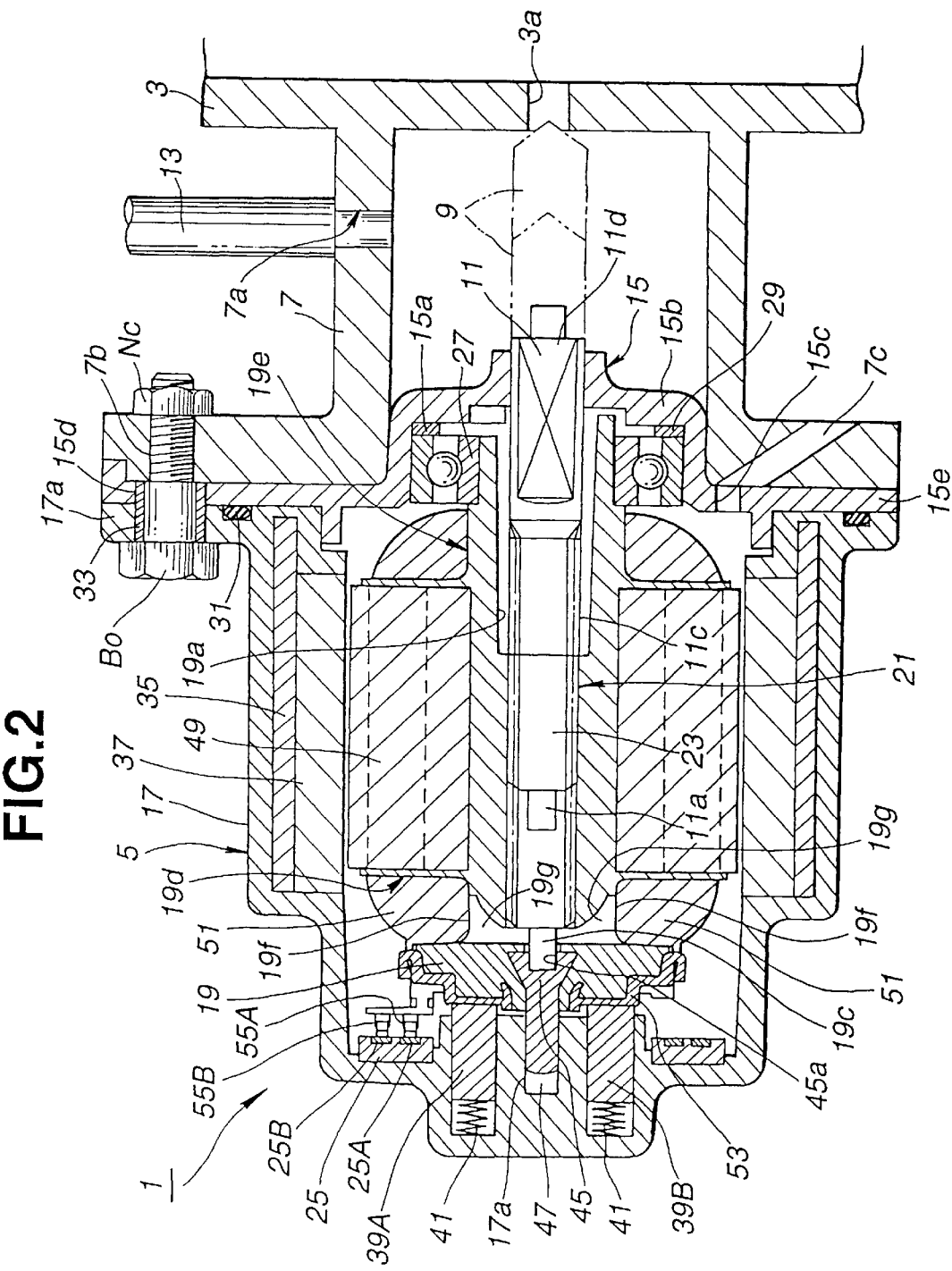
FIG. 2 is a view similar to FIG. 1, showing an exhaust-gas-recirculation control valve with an exhaust passage.

FIGS. 1–7 show a first embodiment of the present invention. Referring to FIG. 2, an exhaust-gas-recirculation control valve 1 comprises a cylindrical support 7 having one end connected to a wall of an exhaust passage 3 connected to an engine main body of a motor vehicle, not shown, on the exhaust side thereof so as to enclose an exhaust-gas outlet 3a, and an electric-motor main body 5 supported by another end of the cylindrical support 7 and including a reciprocating shaft 11 to which a valve element 9 is approachably/withdrawably arranged with respect to the exhaust-gas outlet 3a as indicated by one-dot and two-dot chain lines in FIG. 2.

A cylindrical portion of the cylindrical support 7 is formed with an exhaust-gas discharge port 7a connected to one end of a recirculation passage 13, another end of which is connected to a downstream portion of a throttle valve arranged in a suction passage and connected to the engine main body on the suction side thereof. Thus, when the valve element 9 takes a position distant from the exhaust-gas outlet 3a, exhaust gas is drawn into the cylindrical support 7 in accordance with a substantial opening area of the exhaust-gas outlet 3a, which is introduced into the recirculation passage 13 through the exhaust-gas discharge port 7a in accordance with a negative pressure within the suction passage.

The electric-motor main body 5 comprises a bearing housing 15 forming the front end, a motor housing 17 connected to the bearing housing 15 and forming the outline, a rotor 19 rotatably supported in the motor housing 17 and including therein a female screw 21, the reciprocating shaft 11 arranged in the rotor 19 and including a male screw 23 engaged with the female screw 21, and a rotational angle sensor 25 arranged in the motor housing 17 at the rear end thereof for sensing the rotational angle of the rotor 19.

The bearing housing 15 includes a protrusion 15b on the front surface thereof, which is engaged with the inner periphery of the cylindrical support 7, and a bearing receiver 15a in which a ball bearing 27 is press fitted through a wave washer 29. The ball bearing 27 serves to rotatably support the front end of the rotor 19. Moreover, the bearing housing 15 includes a flange 15e with a through hole 15c which communicates with the air through a communication passage 7c formed in the cylindrical support 7 at another end thereof. The inside of the bearing housing 15 thus communicates with the air through the through hole 15c and the communication passage 7c, allowing release of, e.g. warmed inside air to the outside.

Figure 3:
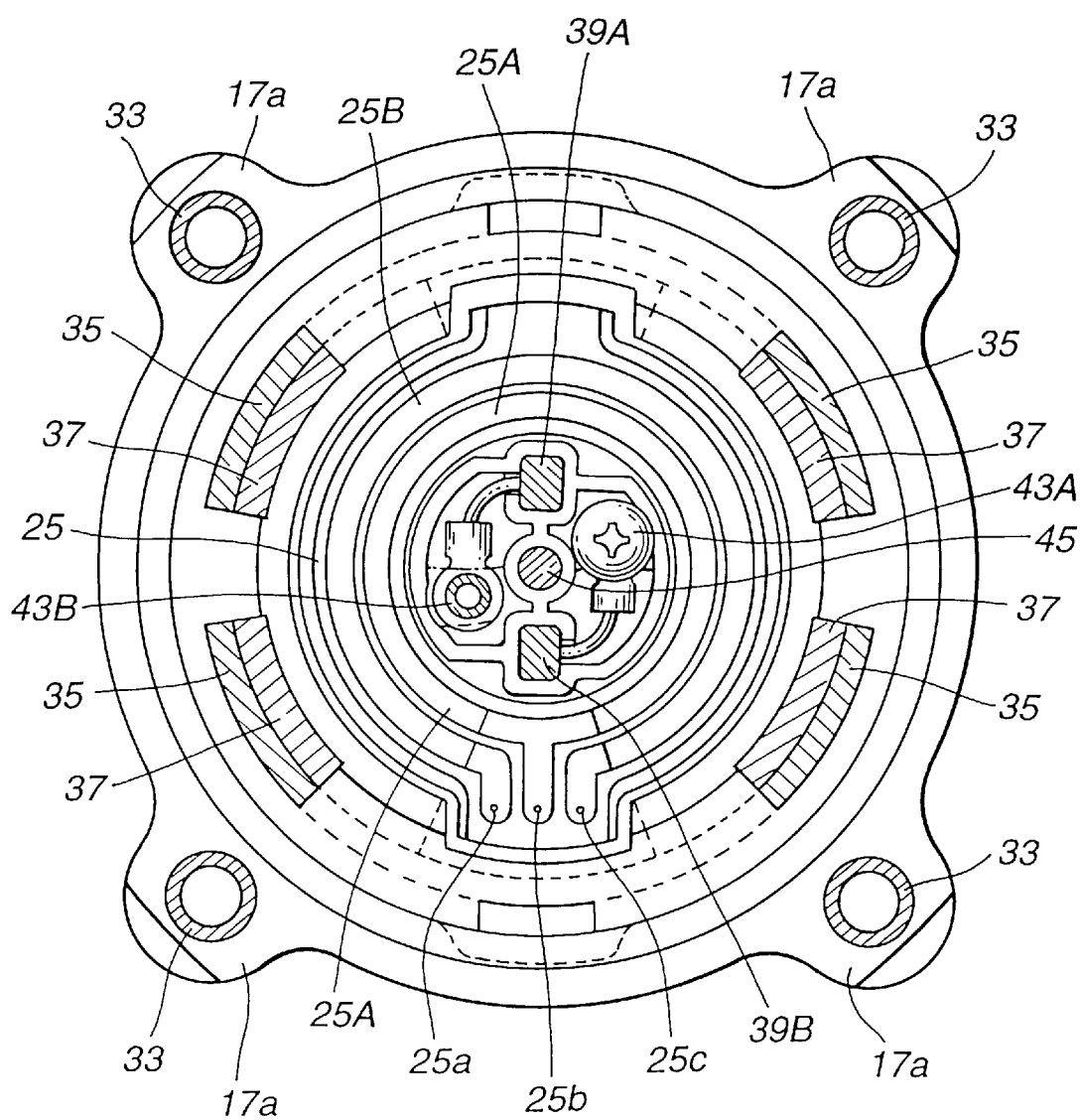
FIG. 3 is a side view, partly section, showing the exhaust-gas-recirculation control valve.

The bearing housing 15 has on the reverse side of the peripheral edge a protrusion engaged with the inner periphery of the motor housing 17. The front end face of the motor housing 17 contacts the bearing housing 15 through an O-ring 31. Referring to FIGS. 2–3, the motor housing 17 made of, e.g. a resin includes a flange 17a in which a collar 33 for receiving a bolt Bo is arranged to correspond to the through hole 15d of the bearing housing 15. The flange 17a is mounted to the cylindrical support 7 at another end thereof through the bolt Bo arranged in a through hole of the collar 33 and a through hole 7b formed in the cylindrical support 7 at another end thereof to correspond to the collar 33, and a nut Nc arranged at another end of the cylindrical support 7 to engage with the bolt Bo. As shown in FIG. 3, two substantially fan-shaped yokes 35 are oppositely arranged at the inner periphery of the motor housing 17, each yoke having the inner surface on which two magnets 37 with a circumferentially curved portion are arranged.

As shown in FIGS. 2–3, a pair of brushes 39A, 39B is arranged in the motor housing 17 in the center of the rear end thereof, and is biased forward by a biasing force of a coil spring 41 disposed in a concavity. The brush 39A is electrically connected to an input terminal 43B arranged at the rear end of the motor housing 17, whereas the brush 39B is electrically connected to an input terminal 43A arranged at the rear end of the motor housing 17.

The rotational angle sensor 25 for sensing the rotational angle of the rotor 19 is arranged in the motor housing 17 at the rear end thereof to enclose the brushes 39A, 39B. As shown in FIG. 3, the rotational angle sensor 25 comprises a first sensing element 25A shaped substantially in a ring, and a second sensing element 25B shaped substantially like the first sensing element 25A and arranged therearound. The first sensing element 25A is connected to an output terminal 25b for providing outside a sensed output, whereas both ends of the second sensing element 25B are connected to output terminals 25a, 25c for providing outside a sensed output, respectively.

The rotor 19 is made of, e.g. a plastic material such as a polyamide resin or a poly(phenylene sulfide) (PPS) resin, or a liquid crystal polymer. The rotor 19 may be made of other material such as a polypropylene resin. As shown in FIG. 2, the rotor 19 has the front end rotatably supported by the ball bearing 27 as described above, and a rear end rotatably supported through one end of a rotor support shaft 45 engaged with a support hole 17a formed between the brushes 39A, 39B against a biasing force of a thrust washer 47, the rotor support shaft 45 being integrated with the rotor 19 to have an axis corresponding to that of the rotor 19. The rotor support shaft 45 has another end formed with a concavity 45a. A commutator 53 is integrated with the rotor 19 at the rear end thereof to contact end faces of the brushes 39A, 39B. Sensing brushes 55A, 55B are arranged to the commutator 53 on the side thereof opposite to the rotational angle sensor 25 to correspond to and contact the sensing elements 25A, 25B thereof.

Figure 6:
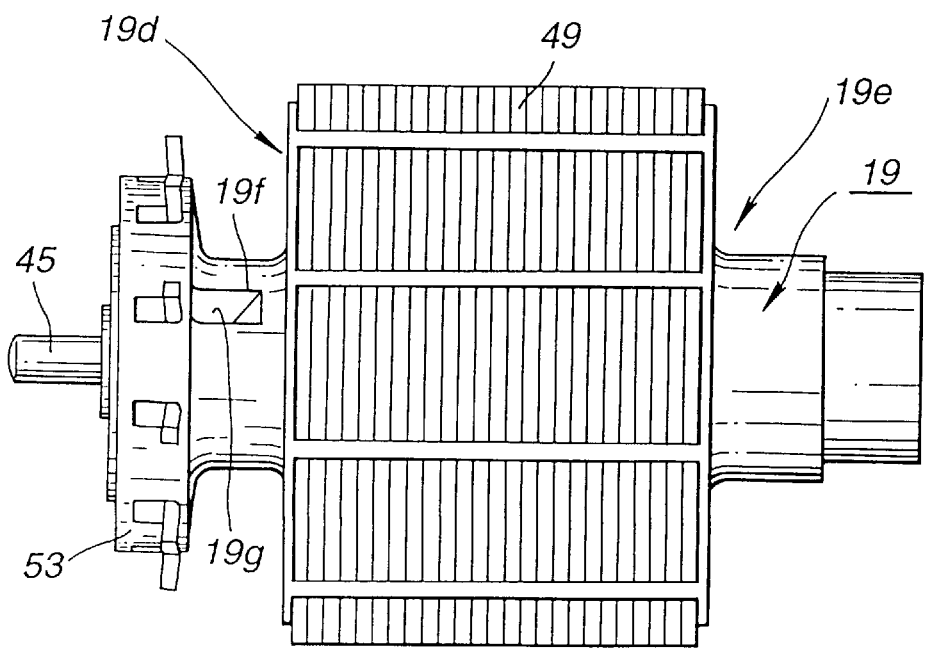
FIG. 6 is a view similar to FIG. 4, showing the rotor and the rotor core.

Arranged substantially in the middle of the outer periphery of the rotor 19 is a rotor core 49 around which a coil 51 is wound in accordance with the number of slots thereof. Ends of the coil 51 are electrically connected to stops of the commutator 53 arranged on the peripheral edge thereof. The rotor core 49 of the rotor 19 has both ends formed with coil assembling portions 19d, 19e in which the coil 51 is assembled. Formed inside the rotor 19 on the same axis are a taper 19a forming the end and having a predetermined inclination, a female screw 21 having the diameter smaller than the small diameter of the taper 19a, and a through hole 19c communicating with the concavity 45a of the rotor support shaft 45 and having the same diameter as that of the concavity 45a. Referring to FIGS. 2 and 6, a communication passage 19g is arranged to ensure communication between an inside space formed by the through hole 19c and the female screw 21 and an opening 19f formed in the coil assembling portion 19d of the rotor core 49 arranged at the rear end thereof.

Figure 7:
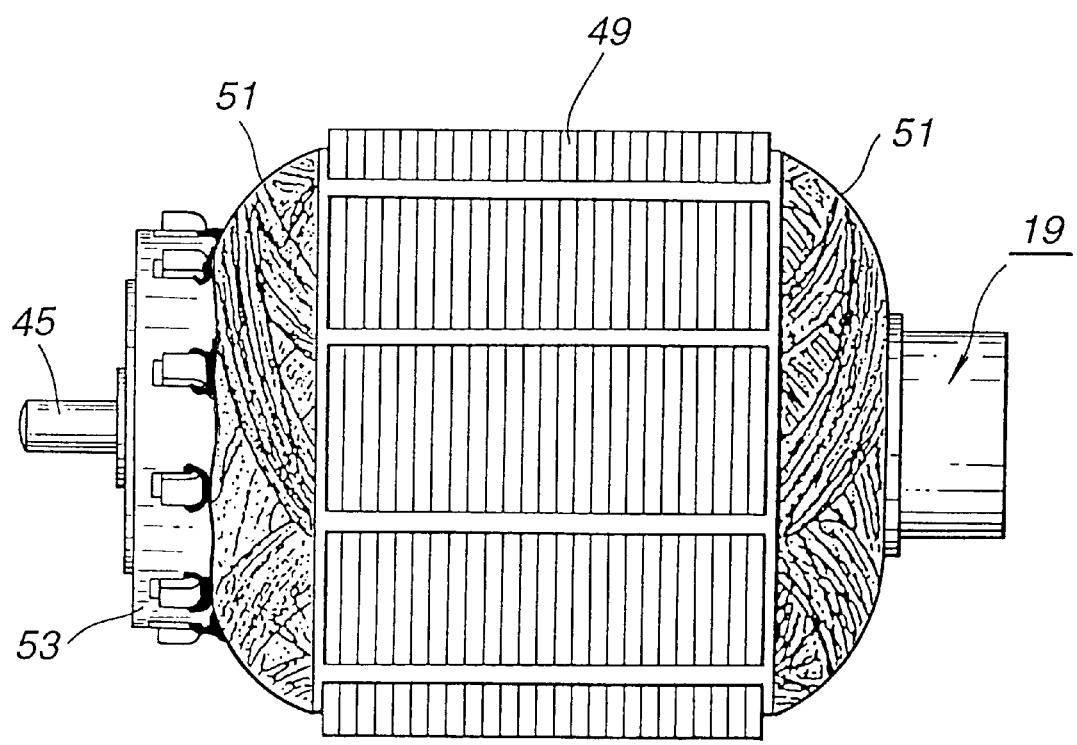
FIG. 7 is a view similar to FIG. 6, showing the rotor and the rotor core with a coil.

Thus, referring to FIG. 7, when the coil 51 is wound around the rotor core 49, the inside space formed by the female screw 21 and that of the motor housing 17 communicate with each other through the communication passage 19g and clearances between parts of the coil 51 assembled in the coil assembling portion 19d. Therefore, when the reciprocating shaft 11 is moved forward, air within the inside space of the motor housing 17 is sucked into the inside space formed by the female screw 21 through the communication passage 19g with floating dust, etc. eliminated by the coil 51. Moreover, sucked air serves to cool the coil 51. On the other hand, when the reciprocating shaft 11 is moved backward, air within the inside space formed by the female screw 21 is released through the communication passage 19g, obtaining smooth movement of the reciprocating shaft 11.

The female screw 21 of the rotor 19 includes, e.g. a trapezoidal thread having a predetermined pitch, and is engaged with an end and a middle of the male screw 23 of the reciprocating shaft 11.

Figure 4:
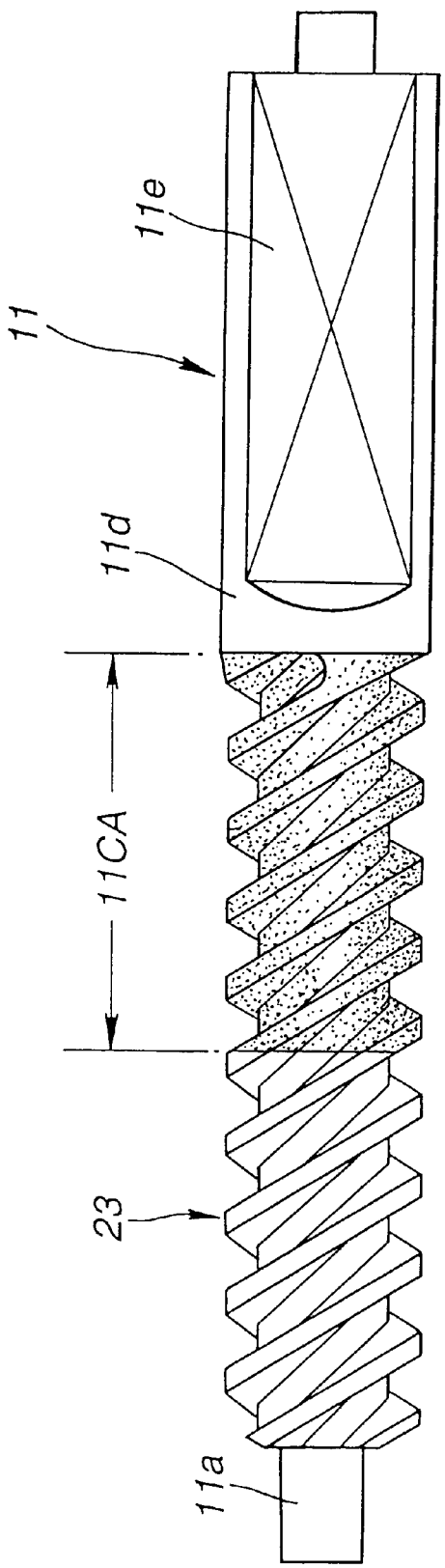
FIG. 4 is a front view, partly section, showing the reciprocating shaft.

Referring to FIG. 4, the reciprocating shaft 11 is made of a metallic material such as stainless steel, and comprises a guide 11a engaged with the through hole 19c and the concavity 45a of the rotor support shaft 45, the male screw 23 engaged with the female screw 21, and a valve-element holder lid having an end to which the valve element 9 is mounted. The valve-element holder lid includes flat portions 11e formed to face each other. The flat portions 11e are in slide contact with a flat surface, not shown, formed in a portion of the protrusion 15b of the bearing housing 15 through which the valve-element holder lid of the reciprocating shaft 11 is arranged. This restrains rotation of the reciprocating shaft 11.

Referring to FIGS. 1 and 4, the male screw 23 of the reciprocating shaft 11 includes, e.g. a trapezoidal thread, and has a coating layer 23a formed in a coating area 11CA with a predetermined length between the boundary between the outer periphery of the male screw 23 and the valve-element holder 11d and the guide 11a. The thickness of the coating layer 23a is determined considering the molding contraction coefficient and variation in dimension due to temperature change of a material of the rotor 19 such as a polyamide resin, or the machining characteristic such as a pitch error of the female screw 21.

By way of example, the thickness of the coating layer 23a is approximately 25–40 $\mu$m when the coating layer 23 includes nickel plating, and the diameter of the male screw 23 is 6 mm, and the molding contraction coefficient of the polyamide resin as a material of the rotor 19 is 0.8%.

In place of nickel plating, the coating layer 23a may include other plating such as zinc, chrome, and tin platings in accordance with a material of the rotor 19. Further, in place of electroplating, the coating layer 23a may be formed by other method/means such as immersion coating, spraying, injection molding, and heat contracting tube. Furthermore, the coating layer 23a may include a polytetrafluoroethylene resin, a molybdenum disulfide resin, a silicone resin, a nylon resin, or a polyester resin in accordance with a material of the rotor 19. By way of example, when the rotor 19 is made of a polypropylene resin, the polytetrafluoroethylene or silicone resin serves as a material of the heat contracting tube.

In the state as shown in FIG. 2, the outer diameter, flank, and root diameter of a portion of the male screw 23 of the reciprocating shaft 11 with the coating layer 23a formed are larger than those of the other portions of the male screw 23 with no coating layer 23a formed, so that the male screw 23 is not engaged with the female screw 21 of the rotor 19. On the other hand, the other portions of the male screw 23 without the coating layer 23a is engaged with the female screw 21 with an appropriate clearance.

An integration of the rotor 19 with the rotor core 49, the commutator 53 and the rotor support shaft 45, and a formation of the female screw 21 and the communication passage 19g in the rotor 19 are carried out as follows. First, the concavity 45a of the rotor support shaft 45 is engaged with the guide 11a of the reciprocating shaft 11. With the side of the commutator 53 which contacts the brushes 39A, 39B not facing the reciprocating shaft 11, the rotor support shaft 45 and the reciprocating shaft 11 which serves as an insert shaft for forming the female screw 21 of the rotor 19 are disposed in a mold, not shown. Moreover, the rotor core 49 is disposed outside the reciprocating shaft 11 substantially in the middle thereof. Further, an insert for forming the communication passage 19g of the rotor 19 is disposed between the commutator 53 and the rotor core 49, and an insert for forming the taper 19a of the rotor 19 is disposed around the valve-element holder 11d of the reciprocating shaft 11.

Subsequently, a melted plastic material as a molding material is injected in a cavity of the mold and between the parts, which is then cooled for solidification. Thus, the reciprocating shaft 11, and the rotor 19 having the commutator 53, the rotor support shaft 45 and the rotor core 49 integrated therewith can be obtained as shown in FIGS. 5–6.

Figure 5:
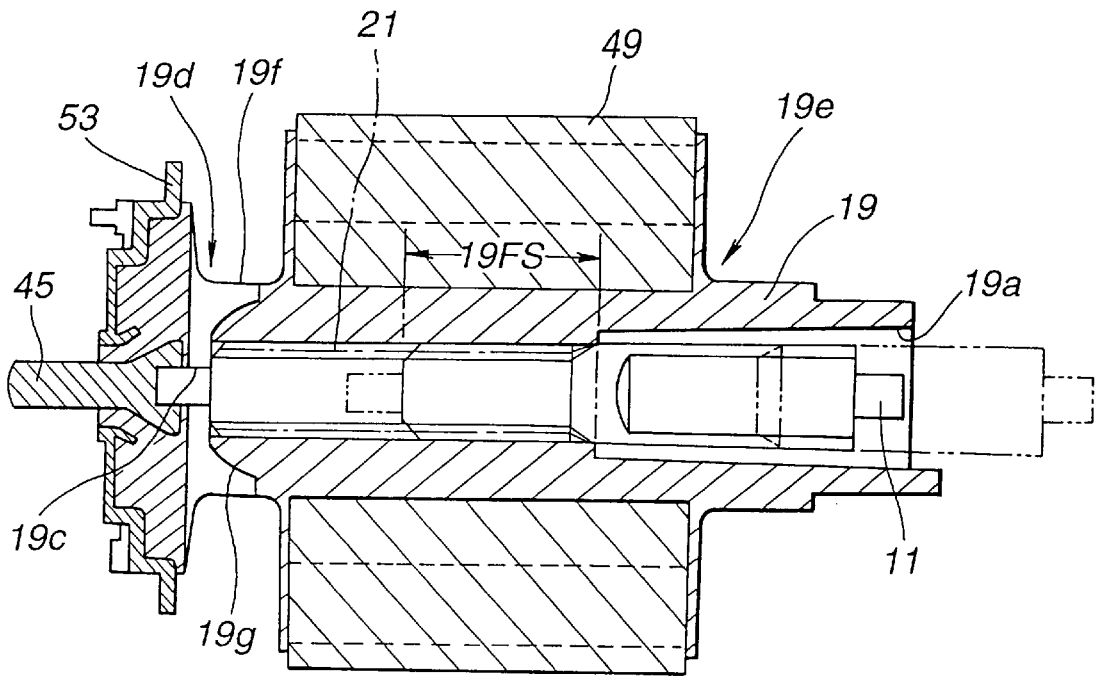
FIG. 5 is a view similar to FIG. 2, showing a rotor and a rotor core.

With the rotor 19 having the rotor core 49 with the coil 51 wound therearound being held, only the reciprocating shaft 11 is rotated as indicated by a two-dot chain line in FIG. 5 so that the concavity 45a of the rotor support shaft 45 is put in non-engagement with the guide 11a of the reciprocating shaft 11, and only the portion of the male screw 23 with the coating layer 23a formed is moved in the taper 19a of the rotor 19 to be in non-engagement therewith.

The female screw 21 of the rotor 19 and the male screw 23 of the reciprocating shaft 11 having the end engaged therewith are disposed in a predetermined position as shown in FIG. 2 in a space defined by the motor housing 17 and the bearing housing 15 which are preformed by injection molding together with the yokes 35, the magnets 37, and the rotational angle sensor 25. The rotor 19 is assembled to the motor housing 17 and the bearing housing 15. Referring to FIGS. 4–5, a portion 19FS of the female screw 21 of the rotor 19 with which the portion of the reciprocating shaft 11 with the coating layer 23a formed is engaged has the inner diameter larger than that of the other portions thereof by the thickness of the coating layer 23a, so that, after the female screw 21 solidifies and contracts, the end of the male screw 21 except the coating area 11CA, i.e. an effective male-screw portion thereof, is engaged with the portion 19FS of the female screw 21 without a needless clearance. Moreover, the female screw 21 of the rotor 19 is formed by using the reciprocating shaft 11, obtaining excellent engagement therewith regardless of dispersion of the machining accuracy of the reciprocating shaft 11, resulting in easy assembling work.

Figure 8:
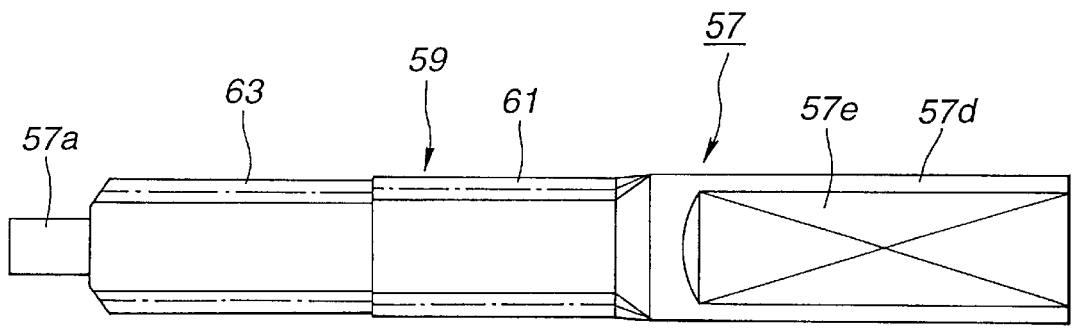
FIG. 8 is a view similar to FIG. 5, showing a second embodiment of the present invention.
Figure 9:
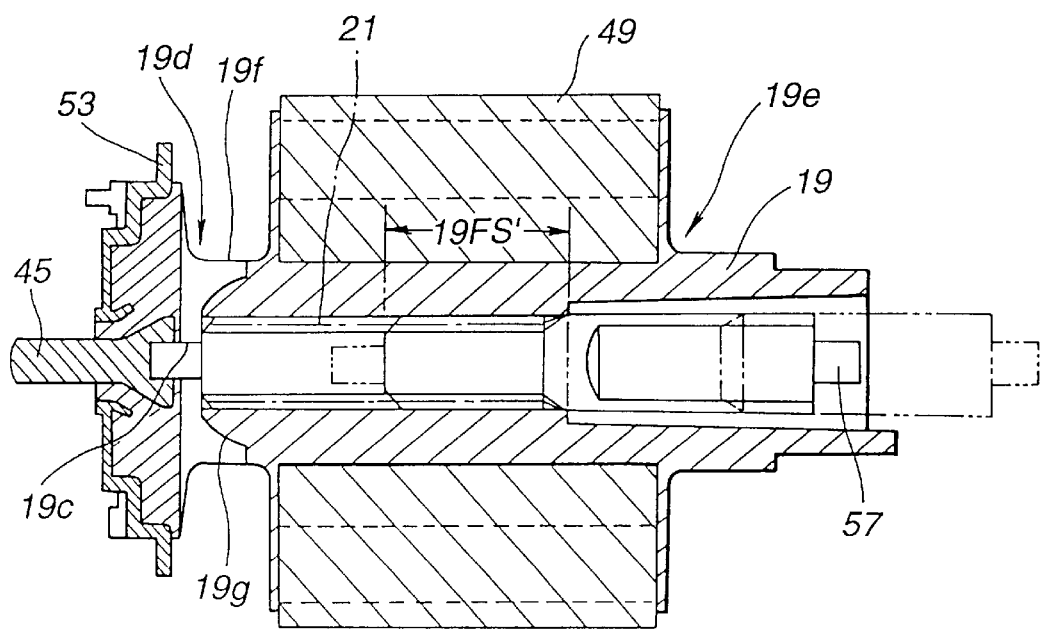
FIG. 9 is a view similar to FIG. 8, explaining a formation of a female screw of the rotor.

FIGS. 8–9 show a second embodiment of the present invention. As for the reciprocating shaft 11 in the first embodiment as shown in FIG. 1, the male screw 23 is partly covered with the coating layer 23a. On the other hand, as for a reciprocating shaft 57 in the second embodiment as shown in FIG. 8, a male screw 59 comprises a first male-screw portion 63 connected to a guide 57a, and a second male-screw portion 61 having the outer diameter larger than that of the first male-screw portion 63.

The reciprocating shaft 57 comprises the guide 57a engaged with the through hole 19c and the concavity 45a of the rotor support shaft 45, the male screw 59 engaged with the female screw 21 of the rotor 19, and a valve-element holder 57d having an end to which the valve element 9 is mounted. The valve-element holder 57d includes flat portions 57e formed to face each other. The flat portions 57e are in slide contact with a flat surface, not shown, formed in a portion of the bearing housing 15 through which the valve-element holder 57d of the reciprocating shaft 57 is arranged. This restrains rotation of the reciprocating shaft 57 in the same way as in the first embodiment.

The male screw 59 is formed, e.g. by rolling. The first and second male-screw portions 63, 61 include, e.g. a trapezoidal thread. The outer diameter of the second male-screw portion 61 is determined to be larger than that of the first male-screw portion 63 in accordance with the molding contraction coefficient of a molding material of the rotor 19. The axial length of the second male-screw portion 61 is determined to be substantially equal to or larger than that of the first male-screw portion 63 in accordance with the stroke length of the reciprocating shaft 57.

Using the reciprocating shaft 57, an integration of the rotor 19 with the rotor core 49, the commutator 53 and the rotor support shaft 45, and a formation of the female screw 21 and the communication passage 19g in the rotor 19 are carried out as follows. First, the concavity 45a of the rotor support shaft 45 is engaged with the guide 57a of the reciprocating shaft 57. With the side of the commutator 53 which contacts the brushes 39A, 39B not facing the reciprocating shaft 57, the commutator 53 is disposed in a mold, not shown. Moreover, the rotor core 49 is disposed outside the reciprocating shaft 57 substantially in the middle thereof. Subsequently, a melted plastic material as a molding material is injected in a cavity of the mold and between the parts, which is then cooled for solidification. Thus, the rotor 19 having the commutator 53, the rotor support shaft 45 and the rotor core 49 integrated therewith can be obtained in the same way as in the first embodiment.

With the rotor 19 having the rotor core 49 with the coil 51 wound therearound being held, only the reciprocating shaft 57 is rotated as indicated by a two-dot chain line in FIG. 9 so that the concavity 45a of the rotor support shaft 45 is put in non-engagement with the guide 57a of the reciprocating shaft 57, and the portion with the second male-screw portion 61 is moved in the taper 19a of the rotor 19. The rotor 19 and the reciprocating shaft 57 assembled thereto are disposed in a predetermined position as shown in FIG. 2 in a space defined by the motor housing 17 and the bearing housing 15 which are preformed by injection molding together with the yokes 35, the magnets 37, and the rotational angle sensor 25. The rotor 19 is assembled to the motor housing 17 and the bearing housing 15. A portion 19FS' of the female screw 21 of the rotor 19 with which the second male-screw portion 61 of the reciprocating shaft 57 is engaged has the inner diameter larger than that of the other portions thereof, so that, after the female screw 21 solidifies and contracts, the first male-screw portion 63 of the male screw 23 is engaged with the portion 19FS' of the female screw 21 without a needless clearance. Moreover, the female screw 21 of the rotor 19 is formed by using the reciprocating shaft 57, obtaining excellent engagement therewith regardless of dispersion of the machining accuracy of the reciprocating shaft 57, resulting in easy assembling work.

In the second embodiment, the male screw 59 is formed by rolling, alternately, it may be formed by other method such as forging such as lost-wax process or die casting, etching, or sintering.

FIGS. 10A–15 show a third embodiment of the present invention. Referring to FIG. 11, an exhaust-gas-recirculation control valve 101 comprises a cylindrical support 107 having one end connected to a wall of an exhaust passage 103 connected to an engine main body of a motor vehicle, not shown, on the exhaust side thereof so as to enclose an exhaust-gas outlet 103a, and an electric-motor main body 105 supported by another end of the cylindrical support 107 and including a reciprocating shaft 111 to which a valve element 109 is approachably/withdrawably arranged with respect to the exhaust-gas outlet 103a as indicated by one-dot and two-dot chain lines in FIG. 11.

A cylindrical portion of the cylindrical support 107 is formed with an exhaust-gas discharge port 107a to which one end of a recirculation passage 113 is connected, another end of which is connected to a downstream portion of a throttle valve arranged in a suction passage and connected to the engine main body on the suction side thereof. Thus, when the valve element 109 takes a position distant from the exhaust-gas outlet 103a, exhaust gas is drawn into the cylindrical support 107 in accordance with a substantial opening area of the exhaust-gas outlet 103a, which is introduced into the recirculation passage 113 through the exhaust-gas discharge port 107a in accordance with a negative pressure within the suction passage.

The electric-motor main body 105 comprises a bearing housing 115 forming the front end, a motor housing 117 connected to the bearing housing 115 and forming the outline, a rotor 119 rotatably supported in the motor housing 117 and including therein a female screw 121, the reciprocating shaft 111 arranged in the rotor 119 and including a male screw 123 engaged with the female screw 121, and a rotational angle sensor 125 arranged in the motor housing 117 at the rear end thereof for sensing the rotational angle of the rotor 119.

The bearing housing 115 includes a protrusion 115b on the front surface thereof, which is engaged with the inner periphery of the cylindrical support 107, and a bearing receiver 115a in which a ball bearing 127 is press fitted through a wave washer 129. The ball bearing 127 serves to rotatably support the front end of the rotor 119. Moreover, the bearing housing 115 includes a flange 115e with a through hole 115c which communicates with the air through a communication passage 107c formed in the cylindrical support 107 at another end thereof. The inside of the bearing housing 115 thus communicates with the air through the through hole 115c and the communication passage 107c, allowing release of, e.g. warmed inside air to the outside.

Figure 12:
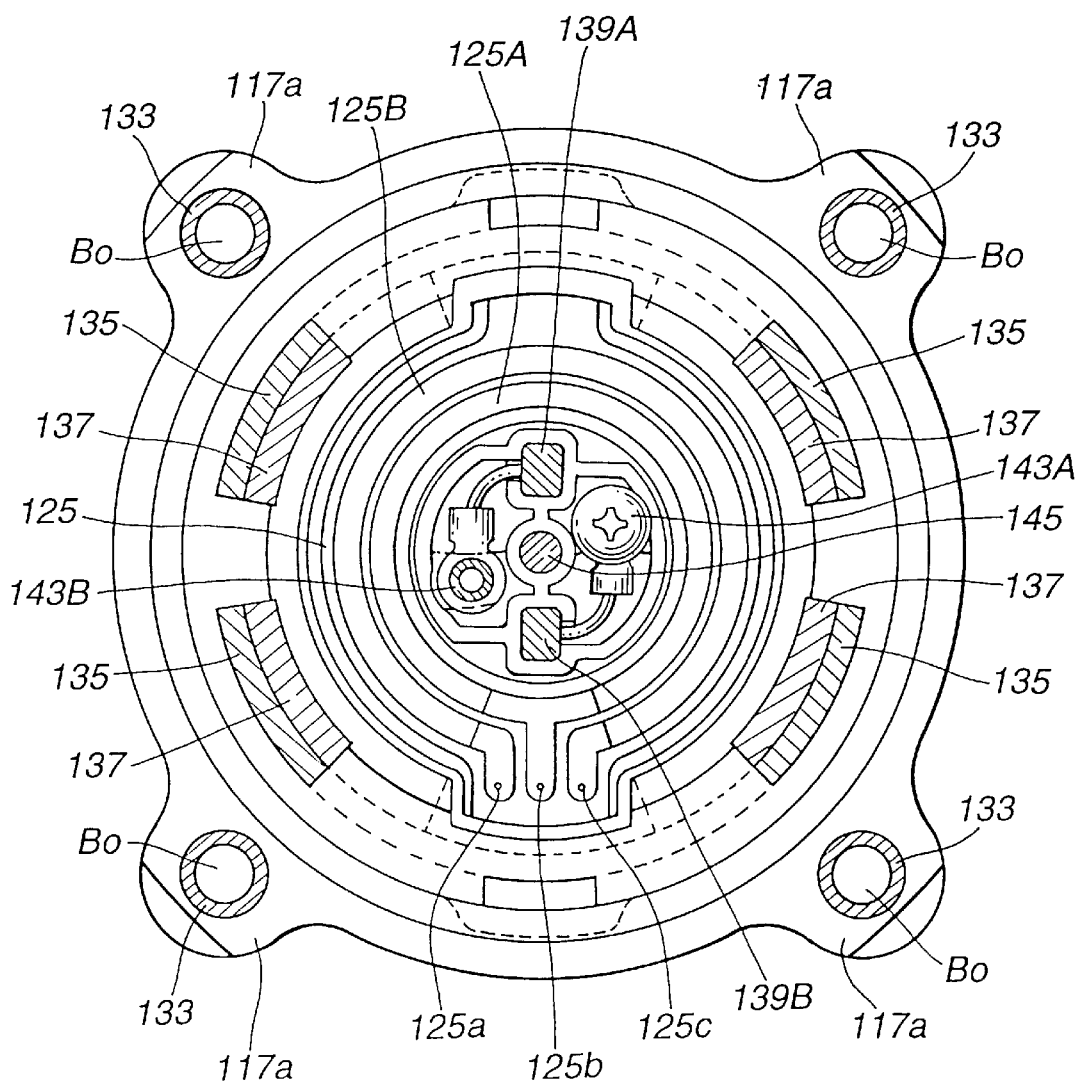
FIG. 12 is a view similar to FIG. 3, showing the exhaust-gas-recirculation control valve.

The bearing housing 115 has on the reverse side of the peripheral edge a protrusion engaged with the inner periphery of the motor housing 117. The front end face of the motor housing 117 contacts the bearing housing 115 through an O-ring 131. Referring to FIGS. 11–12, the motor housing 117 made of, e.g. a resin includes a flange 117a in which a collar 133 for receiving a bolt Bo is arranged to correspond to the through hole 115d of the bearing housing 115. The flange 117a is mounted to the cylindrical support 107 at another end thereof through the bolt Bo arranged in a through hole of the collar 133 and a through hole 107b formed in the cylindrical support 107 at another end thereof to correspond to the collar 133, and a nut Nc arranged at another end of the cylindrical support 107 to engage with the bolt Bo. As shown in FIG. 12, two substantially fan-shaped yokes 135 are oppositely arranged at the inner periphery of the motor housing 117, each yoke having the inner surface on which two magnets 137 with a circumferentially curved portion are arranged.

As shown in FIGS. 11–12, a pair of brushes 139A, 139B is arranged in the motor housing 117 in the center of the rear end thereof, and is biased forward by a biasing force of a coil spring 141 disposed in a concavity. The brush 139A is electrically connected to an input terminal 143B arranged at the rear end of the motor housing 117, whereas the brush 139B is electrically connected to an input terminal 143A arranged at the rear end of the motor housing 117.

The rotational angle sensor 125 for sensing the rotational angle of the rotor 119 is arranged in the motor housing 17 at the rear end thereof to enclose the brushes 139A, 139B. As shown in FIG. 12, the rotational angle sensor 125 comprises a first sensing element 125A shaped substantially in a ring, and a second sensing element 125B shaped substantially like the first sensing element 125A and arranged therearound. The first sensing element 125A is connected to an output terminal 125b for providing outside a sensed output, whereas both ends of the second sensing element 125B are connected to output terminals 125a, 125c for providing outside a sensed output, respectively.

The rotor 119 is made of, e.g. a plastic material such as a polyamide resin or a poly(phenylene sulfide) (PPS) resin, or a liquid crystal polymer. The rotor 119 may be made of other material such as a polypropylene resin. As shown in FIG. 11, the rotor 119 has the front end rotatably supported by the ball bearing 127 as described above, and a rear end to which arranged is a rotor support shaft 145 integrated with the rotor 119 to have an axis corresponding to that of the rotor 119, the rear end being rotatably supported through one end of a rotor support shaft 145 engaged with a support hole 117a formed between the brushes 139A, 139B against a biasing force of a thrust washer 147. The rotor support shaft 145 has another end formed with a concavity 145a with which a guide 111a of the reciprocating shaft 111 as will be described later is engaged. A commutator 153 is integrated with the rotor 119 at the rear end thereof to contact end faces of the brushes 139A, 139B. Sensing brushes 155A, 155B are arranged to the commutator 153 on the side thereof opposite to the rotational angle sensor 125 to correspond to and contact the sensing elements 125A, 125B thereof.

Figure 14:
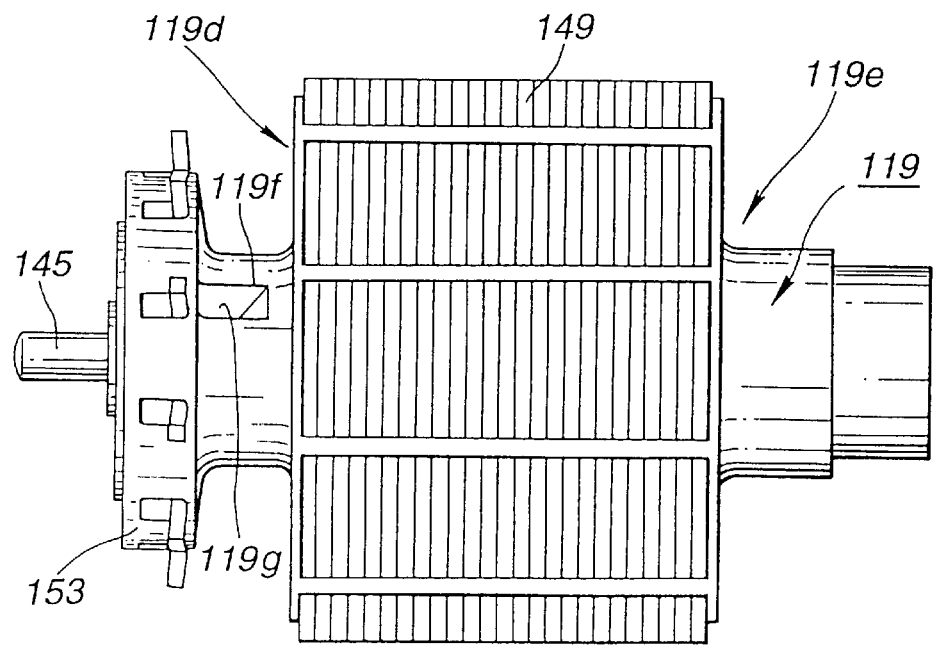
FIG. 14 is a view similar to FIG. 7, showing the rotor and the rotor core.

Arranged substantially in the middle of the outer periphery of the rotor 119 is a rotor core 149 around which a coil 151 is wound in accordance with the number of slots thereof. Ends of the coil 151 are electrically connected to stops of the commutator 153 arranged on the peripheral edge thereof. The rotor core 149 of the rotor 119 has both ends formed with coil assembling portions 119d, 19e in which the coil 151 is assembled. Formed inside the rotor 119 on the same axis are a taper 119a forming the end and having a predetermined inclination, a female screw 121 having the diameter smaller than the small diameter of the taper 119a, and a through hole 119c communicating with the concavity 145a of the rotor support shaft 145 and having the same diameter as that of the concavity 145a. Referring to FIGS. 11 and 14, a communication passage 119g is arranged to ensure communication between an inside space formed by the through hole 119c and the female screw 121 and an opening 119f formed in the coil assembling portion 119d of the rotor core 149 arranged at the rear end thereof.

Figure 15:
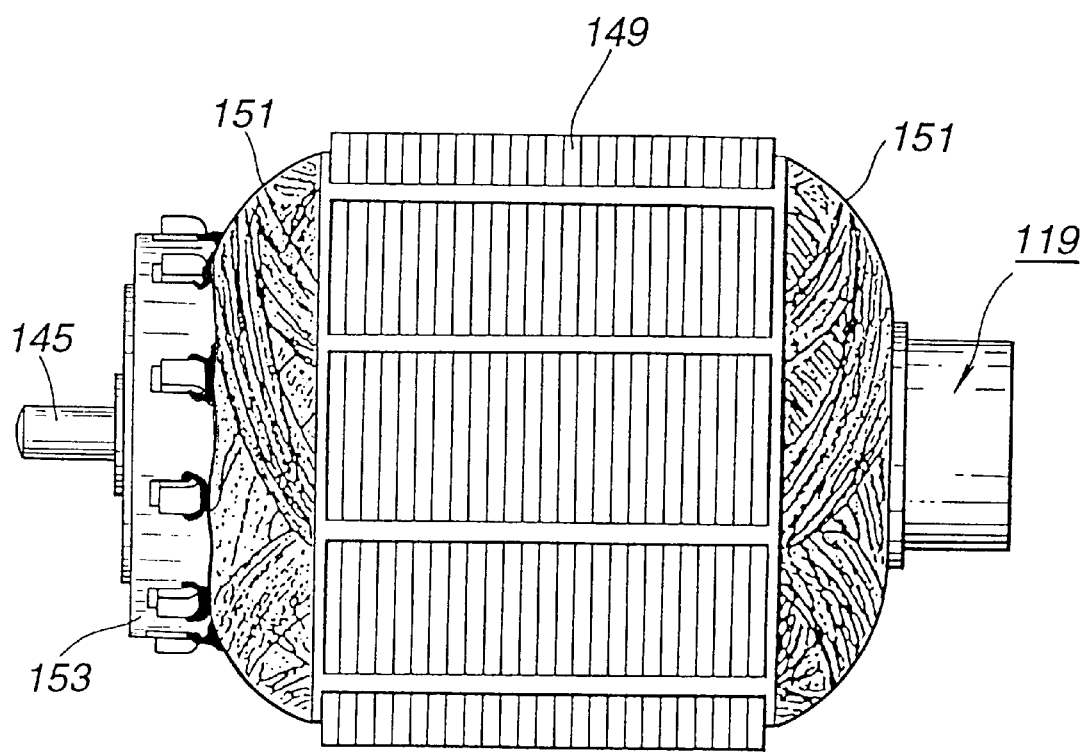
FIG. 15 is a view similar to FIG. 14, showing the rotor and the rotor core with a coil.

Thus, referring to FIG. 15, when the coil 151 is wound around the rotor core 149, the inside space formed by the female screw 121 and that of the motor housing 117 communicate with each other through the communication passage 119g and clearances between parts of the coil 151 assembled in the coil assembling portion 119d. Therefore, when the reciprocating shaft 111 is moved forward, air within the inside space of the motor housing 117 is sucked into the inside space formed by the female screw 121 through the communication passage 119g with floating dust, etc. eliminated by the coil 151. Moreover, sucked air serves to cool the coil 151. On the other hand, when the reciprocating shaft 111 is moved backward, air within the inside space formed by the female screw 121 is released through the communication passage 119g, obtaining smooth movement of the reciprocating shaft 111.

The female screw 121 of the rotor 119 includes, e.g. a trapezoidal thread having a predetermined pitch, and is engaged with an end and a middle of the male screw 123 of the reciprocating shaft 111.

Figures 10A, 10B, 10C:
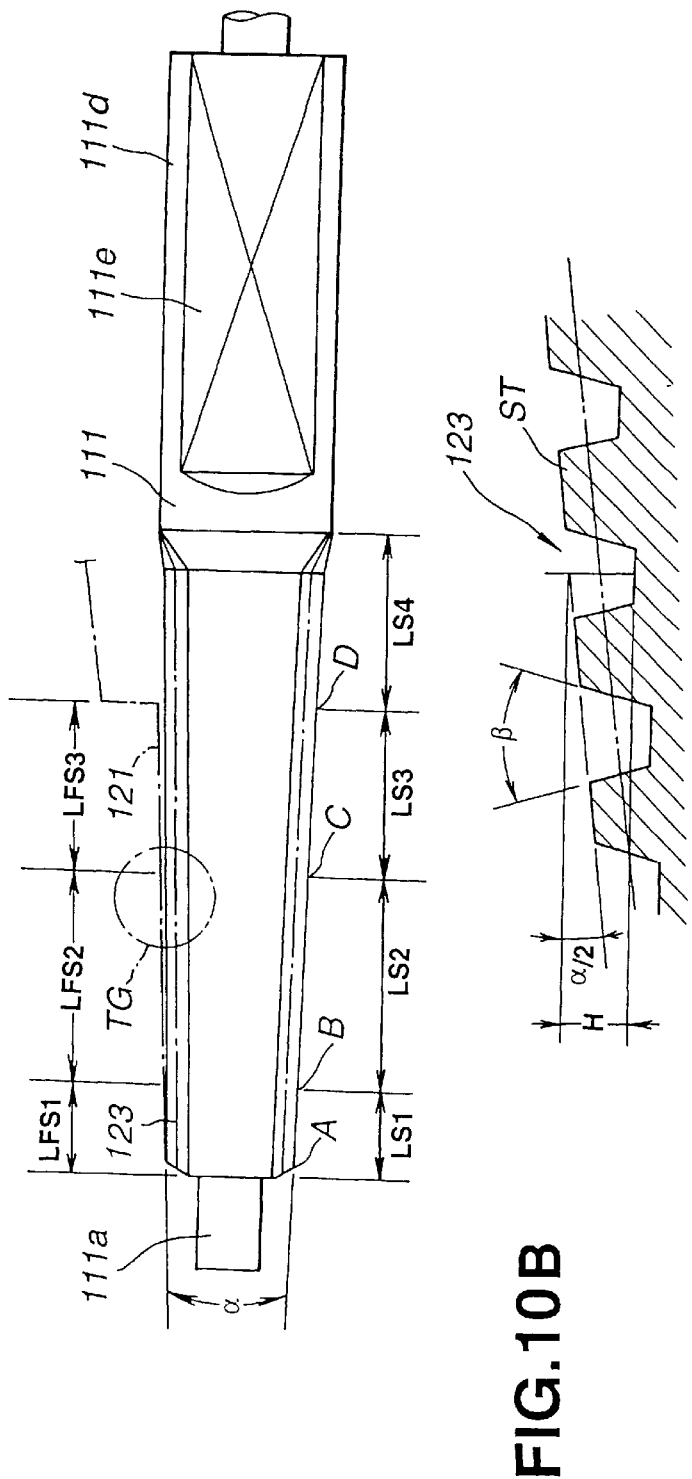
FIG. 10A is a view similar to FIG. 9, showing third embodiment of the present invention.
FIG. 10B is an enlarged view showing one example of a male screw in a portion TG in FIG. 10A.
FIG. 10C is a view similar to FIG. 10B, showing another example of the male screw in the portion TG in FIG. 10A.

Referring to FIG. 10A, the reciprocating shaft 111 is made of a metallic material such as stainless steel, and comprises a guide 111a engaged with the through hole 119c and the concavity 145a of the rotor support shaft 145, the male screw 123 engaged with the female screw 121, and a valve-element holder 111d having an end to which the valve element 109 is mounted. The valve-element holder hid includes flat portions 111e formed to face each other. The flat portions 111e are in slide contact with a flat surface, not shown, formed in a portion of the protrusion 115b of the bearing housing 115 through which the valve-element holder 111d of the reciprocating shaft 111 is arranged. This restrains rotation of the reciprocating shaft 111.

Referring to FIGS. 10A–10B, the male screw 123 of the reciprocating shaft 111 includes, e.g. a taper thread having a predetermined taper angle α, and a trapezoidal section. The male screw 123 includes an end area LS1, an effective engagement tapered area LS2, a middle area LS3, and an incomplete area LS4. The end area LS1 is connected to the guide 111a engaged with the through hole 119c and the concavity 145a of the rotor support shaft 145, and the incomplete area LS4 is adjacent to the valve-element holder 111d. When the reciprocating shaft 111 with the male screw 123 is disposed in a mold to form the female screw 121 to the rotor 119, the end area LS1, the effective engagement tapered area LS2, and the middle area LS3 of the male screw 123 serve to form corresponding areas LFS1, LFS2, and LFS3 of the female screw 121.

The axial lengths of the end area LS1, the effective engagement tapered area LS2, and the middle area LS3 are determined, e.g. to 4.2, 6.0, and 6.0 mm, respectively. The length of the effective engagement tapered area LS2 is determined in accordance with the stroke length of the reciprocating shaft 111. The length of the middle area LS3 is determined to a value which gives an allowable strength of a thread in accordance with a load axially acting on the reciprocating shaft 111. Thus, the sum of the length the effective engagement tapered area LS2 and the length of the middle area LS3 corresponds to an effective thread length of the female screw 121 of the rotor 119.

Referring to FIG. 10B showing a predetermined portion TG of the effective engagement tapered area LS2 in FIG. 10A, a thread ST has a predetermined height (distance between a straight line connecting the tops of the threads and that connecting the centers of the roots of the threads, measured in the direction perpendicular to an axis of the reciprocating shaft 111), and a predetermined pitch of, e.g. 0.5 and 2.4 mm. The side of the top of the thread ST is inclined downward with respect to the straight line connecting the centers of the roots at a predetermined angle, e.g. half of the taper angle α.

The shape of the thread ST is not limited to that as shown in FIG. 10B and may be as shown in FIG. 10C. Referring to FIG. 10C, a thread ST' is formed substantially in the same way as the thread ST except that the side of the top is parallel to that of the root.

Referring to FIG. 10B, an angle β of the thread ST is determined, e.g. to 30°, and the taper angle α is determined considering molding characteristics of the female screw 121 of the rotor 119 such as the contraction coefficient of a plastic material after solidification. The angle β of the thread ST is not limited to 30°, and may be 60°. Moreover, the thread ST may have a triangular section.

The taper angle α of the male screw 123 is determined, e.g. in accordance with the following formulae (1)–(8):

The relation between the taper angle α of the male screw 123, outer diameters Db (e.g. 6.0 mm), Dc of portions B, C of the effective engagement tapered area LS2 as shown in FIG. 10A, and an axial length Lmb of the effective engagement tapered area LS2 is given by the formula (1):

$$\tan\frac{\alpha}{2} = \frac{1}{2}\left(\frac{Dc - Db}{Lmb}\right) \quad (1)$$

The relation between the taper angle α of the male screw 123, an outer diameter Dd of a portion D of the middle area LS3 as shown in FIG. 10A, and an axial length Lmc of the middle area LS3 is given by the formula (2):

$$Dc = Dd - 2Lmc \cdot \tan\frac{\alpha}{2} \quad (2)$$

The relation between the angle α of the male screw 123, an outer diameter Da of a portion A of the end area LS1 as shown in FIG. 10A, the outer diameters Db, Dc of the portions B, C of the effective engagement tapered area LS2, and an axial length Lma of the end area LS1 is given by the formula (3):

$$Da = Dc - 2(Lma + Lmb)\cdot\tan\frac{\alpha}{2} = Dd - 2(Lma + Lmb + Lmc)\cdot\tan\frac{\alpha}{2} \quad (3)$$

As for portions C, D of the areas LFS2, LFS3 of the female screw 121 which is formed by disposing the male screw 123 of the reciprocating shaft 111 in the mold, the relation between root diameters Dcf, Ddf of the portions C, D of the areas LFS2, LFS3 after solidification/contraction, and the outer diameters Db, Dc of the portions B, C of the effective engagement tapered area LS2 is given by the formulas (4)–(5) considering a radial molding contraction coefficient k of a molding material (e.g. 0.008 for a PPS resin):

$$Dcf = Dc(1-k) = \left(Dd - 2Lmc\cdot\tan\frac{\alpha}{2}\right)(1-k) \quad (4)$$

$$Ddf = Dd(1-k) \quad (5)$$

In order to axially smoothly move the reciprocating shaft 111 after forming the areas LFS2, LFS3 of the female screw 121, when the guide 111a of the reciprocating shaft 111 is moved by the length Lma of the end area LS1 to pass from the state engaged with the concavity 145a to the state not engaged therewith, a clearance larger than a predetermined value Cc is needed between the root diameter Ddf of the female screw 121 after solidification/contraction and the outer diameter of the male screw 123. It is noted that the clearance Cc is a minimum value determined in accordance with the property of a molding material of the rotor 119, the shape of the thread, and the finishing accuracy, which is, e.g. 0.025 mm. This produces the relation given by the formula (6):

$$\frac{Ddf - \left(Dd - 2Lma\cdot\tan\frac{\alpha}{2}\right)}{2} \geq Cc \quad (6)$$

Moreover, in order to axially smoothly move the reciprocating shaft 111 when the guide 111a of the reciprocating shaft 111 is moved by the length Lma of the end area LS1 and the length Lmb of the effective engagement tapered area LS2 to pass from the state engaged with the concavity 145a to the state not engaged therewith, a clearance smaller than a predetermined value H(γ/100) is needed between the root diameter Dcf of the female screw 121 after solidification/contraction and the portion A of the outer diameter of the male screw 123. This produces the relation given by the formula (7):

$$\frac{Dcf - Da}{2} \leq H\left(\frac{\gamma}{100}\right) \quad (7)$$

where γ is a maximum value of the rate of a clearance of the top of the male screw 123 with respect to the height H of the thread (e.g. 0.5 mm) in the section of the male and female screws 123, 121 concentrically engaged with each other, which is, e.g. 20%.

The formula (8) is obtained which is indicative of the range of the taper angle α to be determined by the formulae (6)–(7):

$$\frac{2Cc + Dd \cdot k}{2Lma} \leq \tan\frac{\alpha}{2} \leq \frac{2H \cdot \frac{\gamma}{100} + k \cdot Dd}{2(Lmc \cdot k + Lma + Lmb)} \quad (8)$$

When calculating in accordance with the formula (8), the taper angle a is, e.g. between 1.34° or more and 1.38° or less. Thus, the taper angle α is determined, e.g. to 1.35°. When the taper angle α is relatively small, the formula (1) may be replaced with an approximation tan α≈(Dc−Db)/Lmb.

Therefore, the female screw 121 engaged with the male screw 123 of the reciprocating shaft 111, which is formed with a predetermined clearance, allows smooth movement of the male screw 123 in the areas LFS2, LFS3. Moreover, the length of the end area LS can be determined to a relatively small value, enabling a reduction in the overall length of the reciprocating haft 111.

An integration of the rotor 119 with the rotor core 149, the commutator 153, and the rotor support shaft 145, and a formation of the female screw 121 and the communication passage 119g in the rotor 119 are carried out as follows. First, the concavity 145a of the rotor support shaft 145 is engaged with the guide 111a of the reciprocating shaft 111. With the side of the commutator 153 which contacts the brushes 139A, 139B not facing the reciprocating shaft 111, the rotor support shaft 145 and the reciprocating shaft 111 which serves as an insert shaft for forming the female screw 121 of the rotor 119 are disposed in a mold, not shown. Moreover, the rotor core 149 is disposed outside the reciprocating shaft 111 substantially in the middle thereof. Further, an insert for forming the communication passage 119g of the rotor 119 is disposed between the commutator 153 and the rotor core 149, and an insert for forming the taper 119a of the rotor 119 is disposed around the valve-element holder 111d of the reciprocating shaft 111.

Subsequently, a melted plastic material as a molding material is injected in a cavity of the mold and between the parts, which is then cooled for solidification. Thus, the reciprocating shaft 111, and the rotor 119 having the commutator 153, the rotor support shaft 145 and the rotor core 149 integrated therewith can be obtained as shown in FIGS. 13–14.

Figure 13:
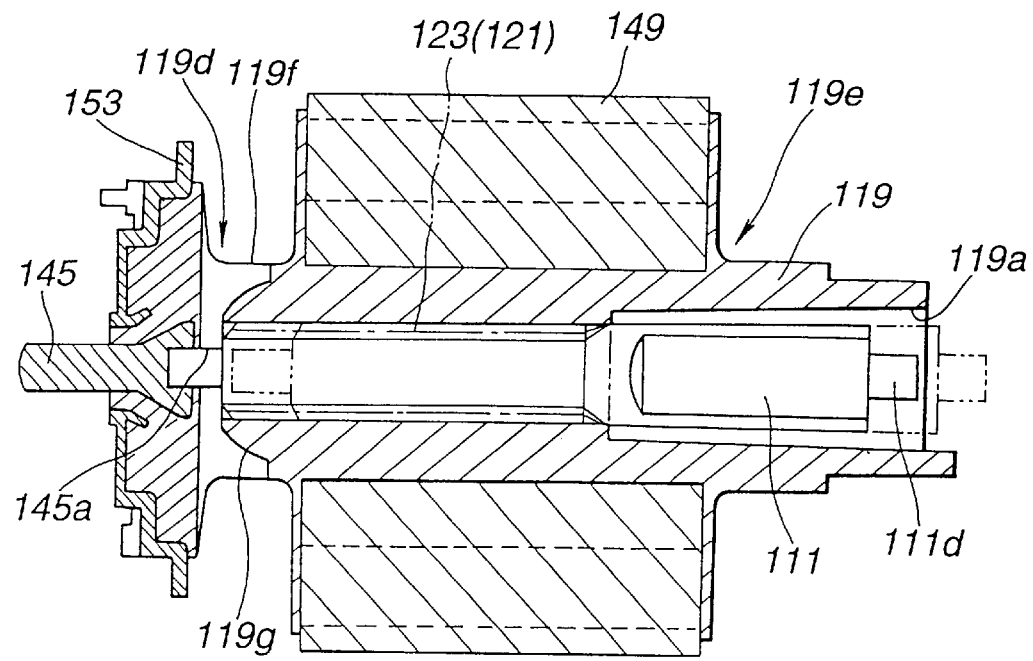
FIG. 13 is a view similar to FIG. 11, showing a rotor and a rotor core.

With the rotor 119 having the rotor core 149 with the coil 151 wound therearound being held, only the reciprocating shaft 111 is rotated as indicated by a two-dot chain line in FIG. 13 so that the guide 111a is moved to the taper 119a by a predetermined length, e.g. the length of the end area LS1.

Thus, due to the tapered section of the male screw 123, the concavity 145a of the rotor support shaft 145 is easily put in non-engagement with the guide 111a of the reciprocating shaft 111. The portion of the female screw 121 formed by the end area LS1 of the male screw 23 is put in non-engagement with the male screw 123, whereas the portion of the female screw 121 formed by the effective engagement tapered area LS2 of the male screw 123 is put in engagement with the end area LS1 and effective engagement tapered area LS2 of the male screw 123.

The female screw 121 of the rotor 119 and the male screw 123 of the reciprocating shaft 111 having the end engaged therewith are disposed in a predetermined position as shown in FIG. 111 in a space defined by the motor housing 117 and the bearing housing 115 which are preformed by injection molding together with the yokes 135, the magnets 137, and the rotational angle sensor 125. The rotor 119 is assembled to the motor housing 117 and the bearing housing 115. Thus, after the female screw 121 solidifies and contracts, the end area LS1 and effective engagement tapered area LS2 of the male screw 123 are engaged with the portion LFS2 of the female screw 121 without a needless clearance. Moreover, the female screw 121 of the rotor 119 is formed by using the reciprocating shaft 111, obtaining excellent engagement therewith regardless of dispersion of the machining accuracy of the reciprocating shaft 111, resulting in easy assembling work.

Figure 16:
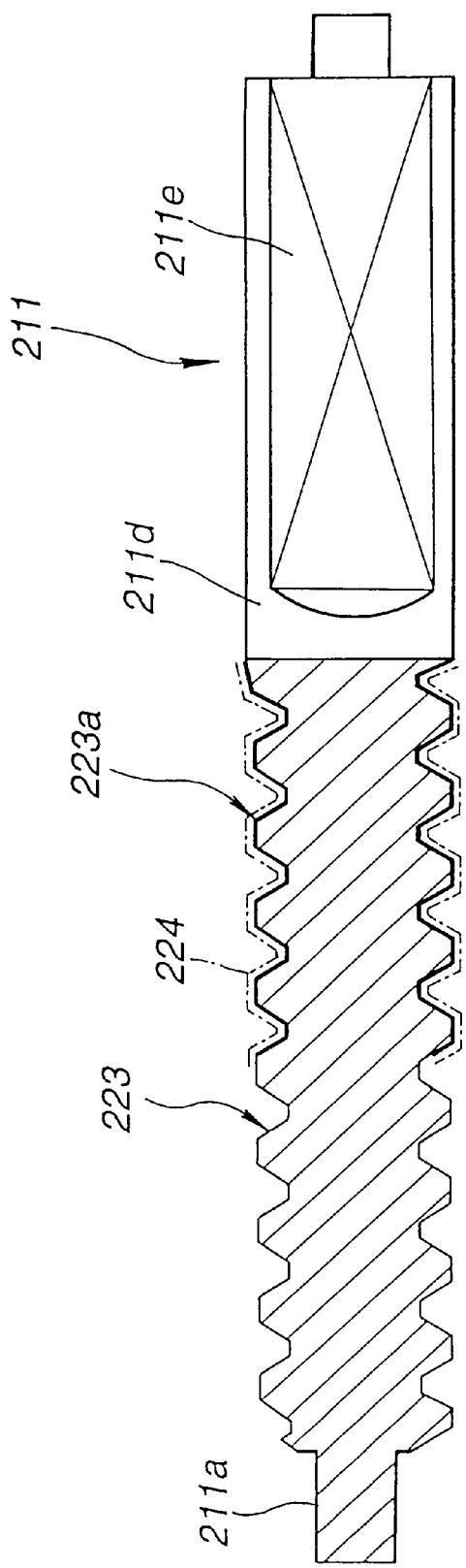
FIG. 16 is a view similar to FIG. 13, showing a third embodiment of the present invention.
Figure 17:
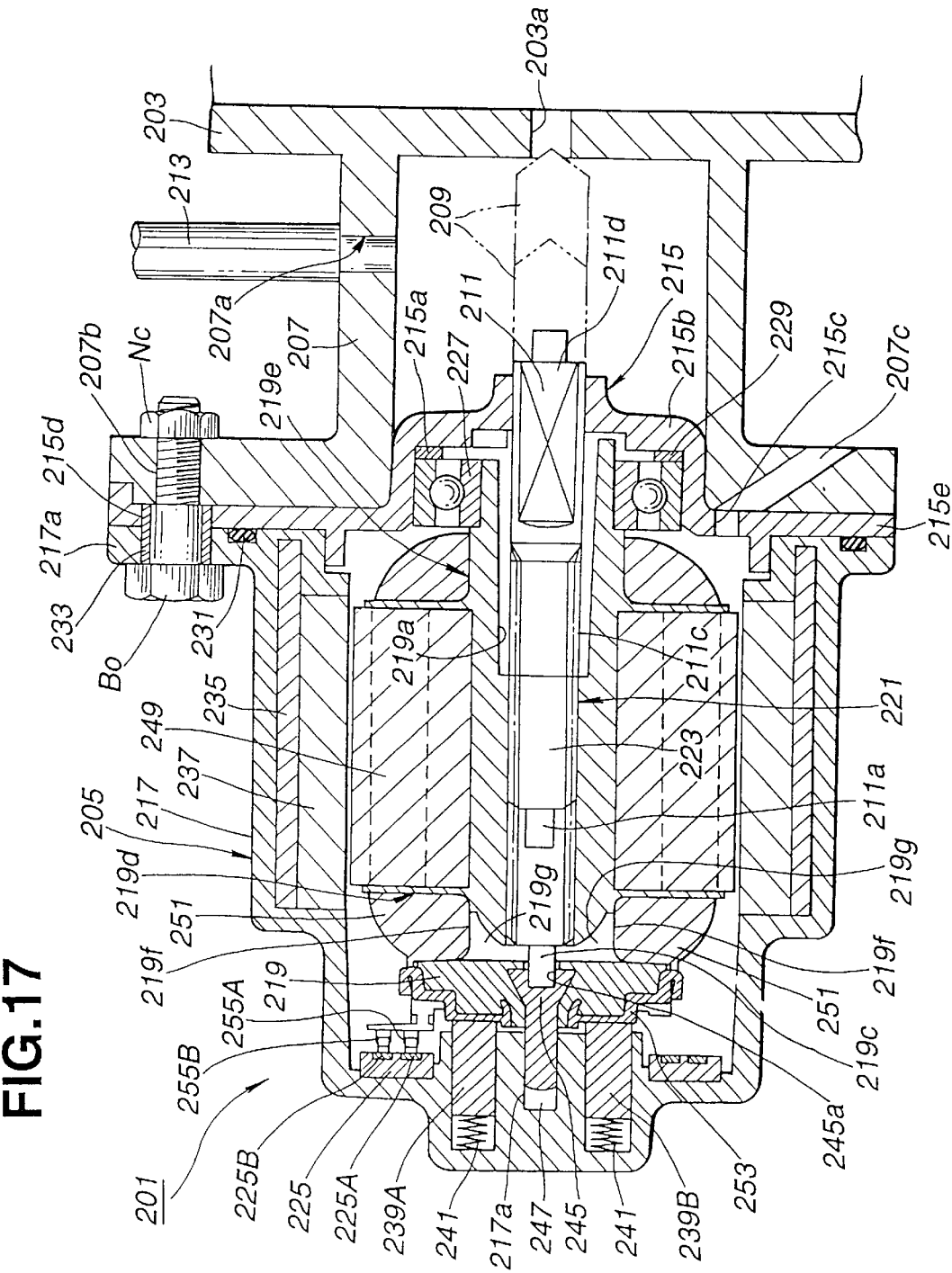
FIG. 17 is a view similar to FIG. 16, showing an exhaust-gas-recirculation control valve with an exhaust passage.

FIGS. 16–22 show a fourth embodiment of the present invention. Referring to FIG. 17, an exhaust-gas-recirculation control valve 201 comprises a cylindrical support 207 having one end connected to a wall of an exhaust passage 203 connected to an engine main body of a motor vehicle, not shown, on the exhaust side thereof so as to enclose an exhaust-gas outlet 203a, and an electric-motor main body 205 supported by another end of the cylindrical support 207 and including a reciprocating shaft 211 to which a valve element 209 is approachably/withdrawably arranged with respect to the exhaust-gas outlet 203a as indicated by one-dot and two-dot chain lines in FIG. 17.

A cylindrical portion of the cylindrical support 207 is formed with an exhaust-gas discharge port 207a connected to one end of a recirculation passage 213, another end of which is connected to a downstream portion of a throttle valve arranged in a suction passage and connected to the engine main body on the suction side thereof. Thus, when the valve element 209 takes a position distant from the exhaust-gas outlet 203a, exhaust gas is drawn into the cylindrical support 207 in accordance with a substantial opening area of the exhaust-gas outlet 203a, which is introduced into the recirculation passage 213 through the exhaust-gas discharge port 207a in accordance with a negative pressure within the suction passage.

The electric-motor main body 205 comprises a bearing housing 215 forming the front end, a motor housing 217 connected to the bearing housing 215 and forming the outline, a rotor 219 rotatably supported in the motor housing 217 and including therein a female screw 221, the reciprocating shaft 211 arranged in the rotor 219 and including a male screw 223 engaged with the female screw 221, and a rotational angle sensor 225 arranged in the motor housing 217 at the rear end thereof for sensing the rotational angle of the rotor 219.

The bearing housing 215 includes a protrusion 215b on the front surface thereof, which is engaged with the inner periphery of the cylindrical support 207, and a bearing receiver 215a in which a ball bearing 227 is press fitted through a wave washer 229. The ball bearing 227 serves to rotatably support the front end of the rotor 219. Moreover, the bearing housing 215 includes a flange 215e with a through hole 215c which communicates with the air through a communication passage 207c formed in the cylindrical support 207 at another end thereof. The inside of the bearing housing 215 thus communicates with the air through the through hole 215c and the communication passage 207c, allowing release of, e.g. warmed inside air to the outside.

Figure 18:
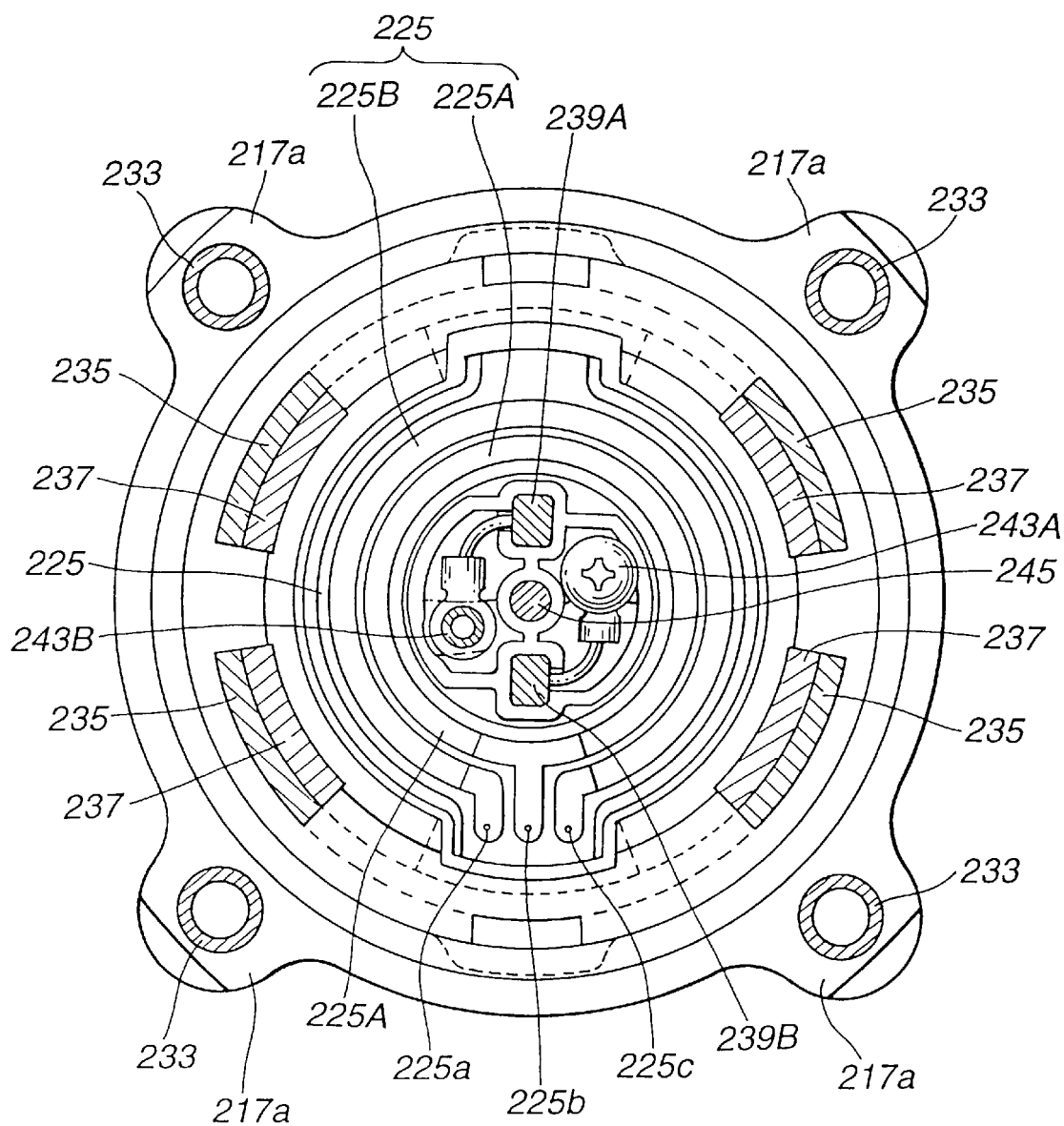
FIG. 18 is a view similar to FIG. 12, showing the exhaust-gas-recirculation control valve.

The bearing housing 215 has on the reverse side of the peripheral edge a protrusion engaged with the inner periphery of the motor housing 217. The front end face of the motor housing 217 contacts the bearing housing 215 through an O-ring 231. Referring to FIGS. 17–18, the motor housing 217 made of, e.g. a resin includes a flange 217a in which a collar 233 for receiving a bolt Bo is arranged to correspond to the through hole 215d of the bearing housing 215. The flange 217a is mounted to the cylindrical support 207 at another end thereof through the bolt Bo arranged in a through hole of the collar 233 and a through hole 207b formed in the cylindrical support 207 at another end thereof to correspond to the collar 233, and a nut Nc arranged at another end of the cylindrical support 207 to engage with the bolt Bo. As shown in FIG. 18, two substantially fan-shaped yokes 235 are oppositely arranged at the inner periphery of the motor housing 217, each yoke having the inner surface on which two magnets 237 with a circumferentially curved portion are arranged.

As shown in FIGS. 17–18, a pair of brushes 239A, 239B is arranged in the motor housing 217 in the center of the rear end thereof, and is biased forward by a biasing force of a coil spring 241 disposed in a concavity. The brush 239A is electrically connected to an input terminal 243B arranged at the rear end of the motor housing 217, whereas the brush 239B is electrically connected to an input terminal 243A arranged at the rear end of the motor housing 217.

The rotational angle sensor 225 for sensing the rotational angle of the rotor 219 is arranged in the motor housing 217 at the rear end thereof to enclose the brushes 239A, 239B. As shown in FIG. 18, the rotational angle sensor 225 comprises a first sensing element 225A shaped substantially in a ring, and a second sensing element 225B shaped substantially like the first sensing element 225A and arranged therearound. The first sensing element 225A is connected to an output terminal 225b for providing outside a sensed output, whereas both ends of the second sensing element 225B are connected to output terminals 225a, 225c for providing outside a sensed output, respectively.

The rotor 219 is made of, e.g. a plastic material such as a polyamide resin or a poly(phenylene sulfide) (PPS) resin, or a liquid crystal polymer. The rotor 219 may be made of other material such as a polypropylene resin. As shown in FIG. 17, the rotor 219 has the front end rotatably supported by the ball bearing 227 as described above, and a rear end rotatably supported through one end of a rotor support shaft 245 engaged with a support hole 217a formed between the brushes 239A, 239B against a biasing force of a thrust washer 247, the rotor support shaft 245 being integrated with the rotor 219 to have an axis corresponding to that of the rotor 219. The rotor support shaft 245 has another end formed with a concavity 245a. A commutator 253 is integrated with the rotor 219 at the rear end thereof to contact end faces of the brushes 239A, 239B. Sensing brushes 255A, 255B are arranged to the commutator 253 on the side thereof opposite to the rotational angle sensor 225 to correspond to and contact the sensing elements 225A, 225B thereof.

Figure 21:
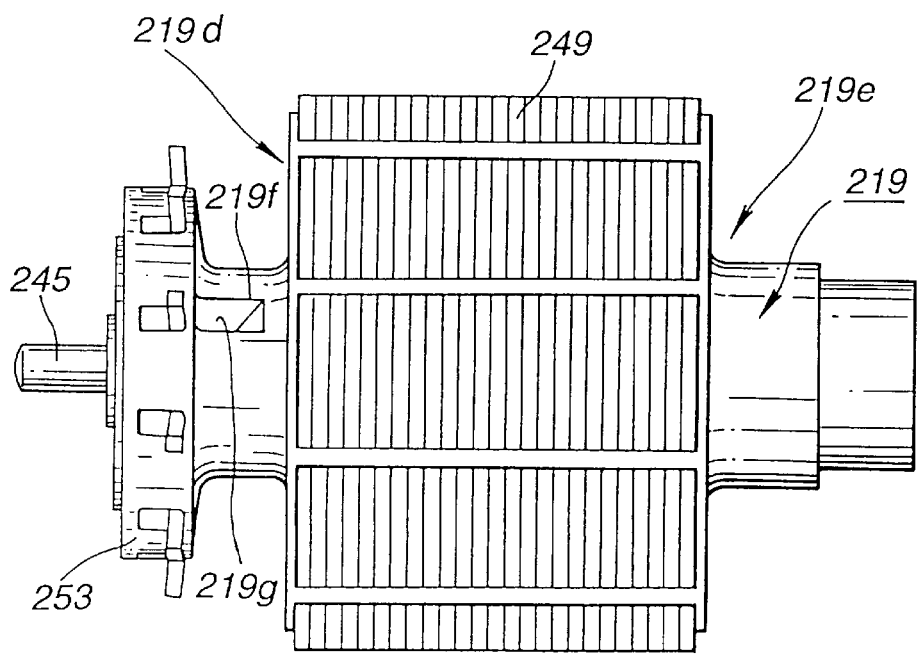
FIG. 21 is a view similar to FIG. 19, showing the rotor and the rotor core.

Arranged substantially in the middle of the outer periphery of the rotor 219 is a rotor core 249 around which a coil 251 is wound in accordance with the number of slots thereof. Ends of the coil 251 are electrically connected to stops of the commutator 253 arranged on the peripheral edge thereof. The rotor core 249 of the rotor 219 has both ends formed with coil assembling portions 219d, 219e in which the coil 251 is assembled. Formed inside the rotor 219 on the same axis are a taper 219a forming the end and having a predetermined inclination, a female screw 221 having the diameter smaller than the small diameter of the taper 219a, and a through hole 219c communicating with the concavity 245a of the rotor support shaft 245 and having the same diameter as that of the concavity 245a. Referring to FIGS. 17 and 21, a communication passage 219g is arranged to ensure communication between an inside space formed by the through hole 219c and the female screw 221 and an opening 219f formed in the coil assembling portion 219d of the rotor core 249 arranged at the rear end thereof.

Figure 22:
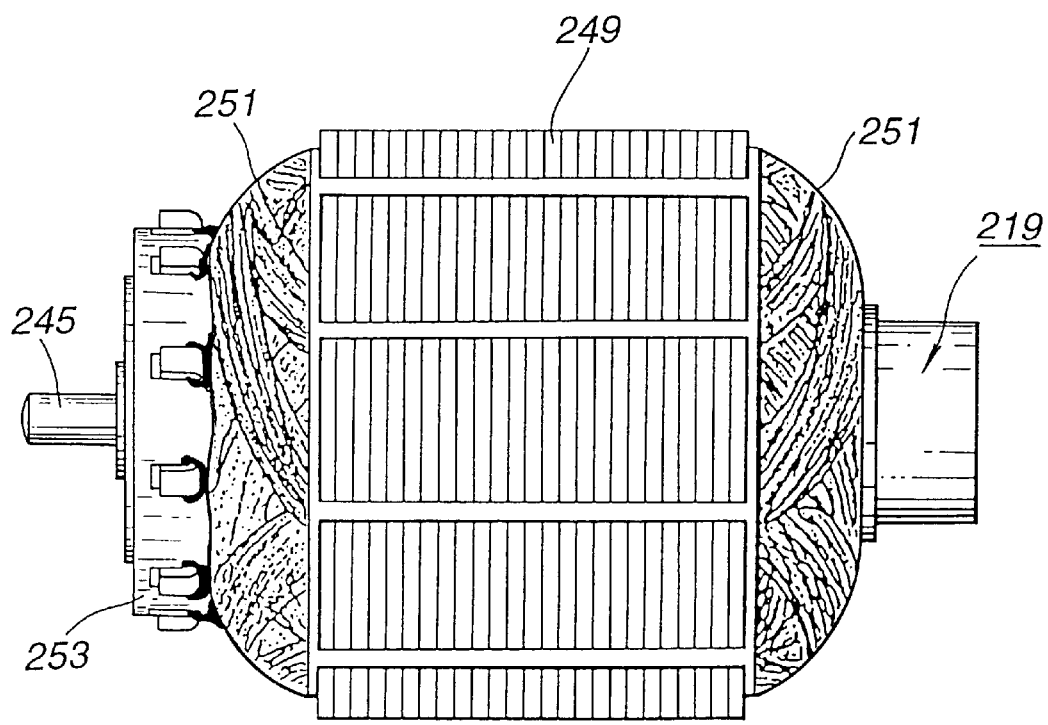
FIG. 22 is a view similar to FIG. 21, showing the rotor and the rotor core with a coil.

Thus, referring to FIG. 22, when the coil 251 is wound around the rotor core 249, the inside space formed by the female screw 221 and that of the motor housing 217 communicate with each other through the communication passage 219g and clearances between parts of the coil 251 assembled in the coil assembling portion 219d. Therefore, when the reciprocating shaft 211 is moved forward, air within the inside space of the motor housing 217 is sucked into the inside space formed by the female screw 221 through the communication passage 219g with floating dust, etc. eliminated by the coil 251. Moreover, sucked air serves to cool the coil 251. On the other hand, when the reciprocating shaft 211 is moved backward, air within the inside space formed by the female screw 221 is released through the communication passage 219g, obtaining smooth movement of the reciprocating shaft 211.

The female screw 221 of the rotor 219 includes, e.g. a trapezoidal thread having a predetermined pitch, and is engaged with an end and a middle of the male screw 223 of the reciprocating shaft 211.

Figure 19:
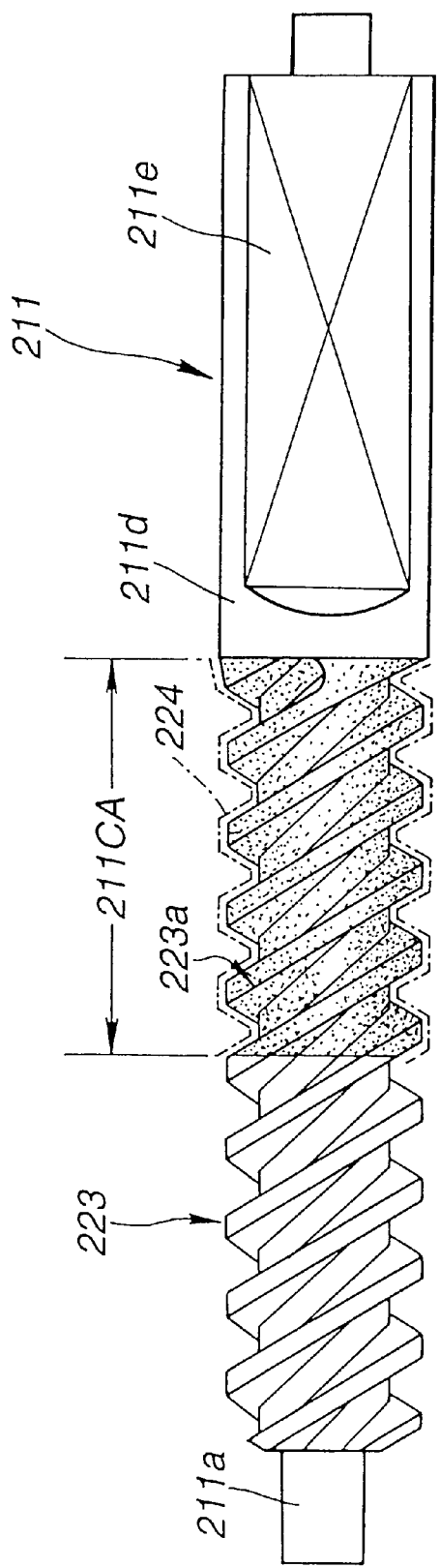
FIG. 19 is a view similar to FIG. 15, showing the reciprocating shaft.

Referring to FIG. 19, the reciprocating shaft 211 is made of a metallic material such as stainless steel, and comprises a guide 211a engaged with the through hole 219c and the concavity 245a of the rotor support shaft 245, the male screw 223 engaged with the female screw 221, and a valve-element holder 211d having an end to which the valve element 209 is mounted. The valve-element holder 211d includes flat portions 211e formed to face each other. The flat portions 211e are in slide contact with a flat surface, not shown, formed in a portion of the protrusion 215b of the bearing housing 215 through which the valve-element holder 211d of the reciprocating shaft 211 is arranged. This restrains rotation of the reciprocating shaft 211.

Referring to FIGS. 16 and 19, the male screw 223 of the reciprocating shaft 211 includes, e.g. a trapezoidal thread, and has a coating layer 223a formed in a coating area 211CA with a predetermined length between the boundary between the outer periphery of the male screw 223 and the valve-element holder 211d and the guide 211a. The thickness of the coating layer 223a is determined considering the molding contraction coefficient and variation in dimension due to temperature change of a material of the rotor 219 such as a polyamide resin, or the machining characteristic such as a pitch error of the female screw 221.

By way of example, the thickness of the coating layer 223a is approximately 25–40 $\mu$m when the coating layer 223 includes nickel plating, and the diameter of the male screw 223 is 6 mm, and the molding contraction coefficient of the polyamide resin as a material of the rotor 219 is 0.8%.

In place of nickel plating, the coating layer 223a may include other plating such as zinc, chrome, and tin platings in accordance with a material of the rotor 219. Further, in place of electroplating, the coating layer 223a may be formed by other method/means such as immersion coating, spraying, injection molding, and heat contracting tube. Furthermore, the coating layer 223a may include a polytetrafluoroethylene resin, a molybdenum disulfide resin, a silicone resin, a nylon resin, or a polyester resin in accordance with a material of the rotor 219. By way of example, when the rotor 219 is made of a polypropylene resin, the polytetrafluoroethylene or silicone resin serves as a material of the heat contracting tube.

Referring to FIGS. 16 and 19, a layer 224 of lubricant such as grease containing molybdenum disulfide, graphite, lead oxide, or polytetrafluoroethylene is placed on the coating layer 223a by spraying as indicated by a one-dot chain line. The thickness of the lubricant layer 224 is, e.g. approximately 1 $\mu$m or less. Lubricant may be of the solid type containing boron oxide with lead oxide, molybdenum disulfide, or calcium fluoride. The lubricant layer 224 may be formed on the entirety of the male screw 223.

In the state as shown in FIG. 17, the outer diameter, flank, and root diameter of a portion of the male screw 223 of the reciprocating shaft 211 with the coating layer 223a formed are larger than those of the other portions of the male screw 223 with no coating layer 223a formed, so that the male screw 223 is not engaged with the female screw 221 of the rotor 219. On the other hand, the other portions of the male screw 223 without the coating layer 223a is engaged with the female screw 221 with an appropriate clearance. Due to its relatively small thickness with respect to the thickness of the coating layer 223a, it appears that the lubricant layer 224 influences less the dimension of the female screw 221 formed to the rotor 219.

An integration of the rotor 219 with the rotor core 249, the commutator 253 and the rotor support shaft 245, and a formation of the female screw 221 and the communication passage 219g in the rotor 219 are carried out as follows. First, the concavity 245a of the rotor support shaft 245 is engaged with the guide 211a of the reciprocating shaft 211, and with the side of the commutator 253 which contacts the brushes 239A, 239B not facing the reciprocating shaft 211, the rotor support shaft 245 and the reciprocating shaft 211 which serves as an insert shaft for forming the female screw 221 of the rotor 219 are disposed in a mold, not shown. Moreover, the rotor core 249 is disposed outside the reciprocating shaft 211 substantially in the middle thereof. Further, an insert for forming the communication passage 219g of the rotor 219 is disposed between the commutator 53 and the rotor core 249, and an insert for forming the taper 219a of the rotor 219 is disposed around the valve-element holder 211d of the reciprocating shaft 211.

Subsequently, a melted plastic material as a molding material is injected in a cavity of the mold and between the parts, which is then cooled for solidification. Thus, the reciprocating shaft 211, and the rotor 219 having the commutator 253, the rotor support shaft 245 and the rotor core 249 integrated therewith can be obtained as shown in FIGS. 20–21.

Figure 20:
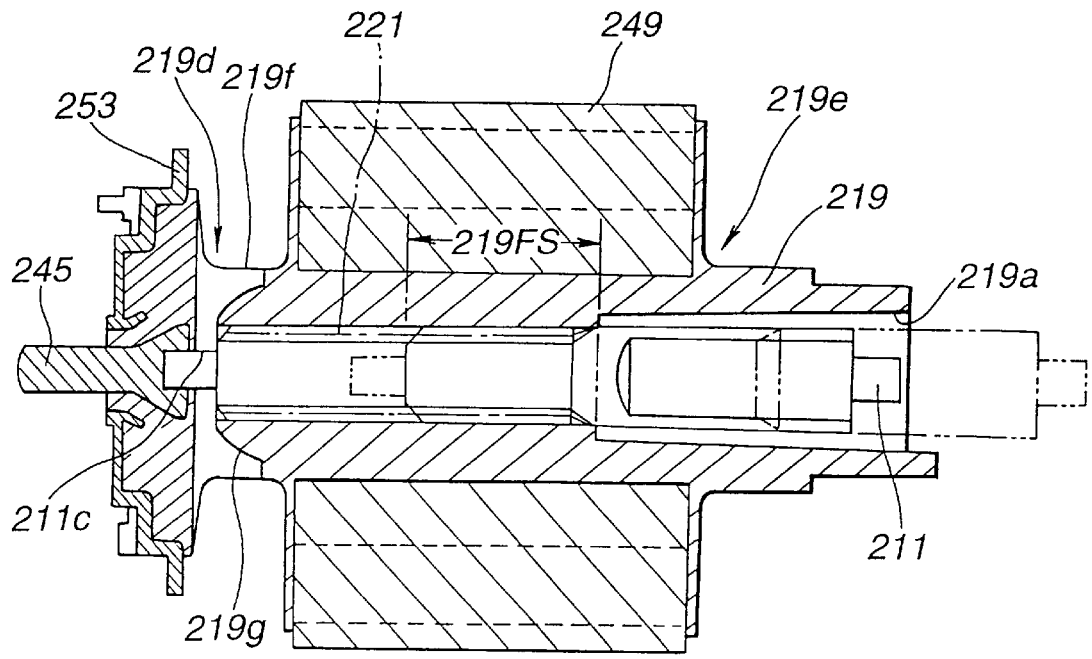
FIG. 20 is a view similar to FIG. 17, showing a rotor and a rotor core.

With the rotor 219 having the rotor core 249 with the coil 251 wound therearound being held, only the reciprocating shaft 211 is rotated as indicated by a two-dot chain line in FIG. 20 so that the concavity 245a of the rotor support shaft 245 is put in non-engagement with the guide 211a of the reciprocating shaft 211, and only the portion of the male screw 223 with the coating layer 223a formed is moved in the taper 219a of the rotor 219 to be in non-engagement therewith. Due to existence of the lubricant layer 224 formed on the coating layer 223a, the reciprocating shaft 211 can be moved by relatively small torque, resulting easy assembling work. Moreover, since lubricant is also placed on the female screw 221 of the rotor 219 engaged with the end of the male screw 223 of the reciprocating shaft 211, lubrication can be ensured between the end of the male screw 223 and the female screw 221 without providing lubricant. This results in elimination of a work of placing lubricant between the end of the male screw 223 and the female screw 221.

The female screw 221 of the rotor 219 and the male screw 223 of the reciprocating shaft 211 having the end engaged therewith are disposed in a predetermined position as shown in FIG. 17 in a space defined by the motor housing 217 and the bearing housing 215 which are preformed by injection molding together with the yokes 235, the magnets 237, and the rotational angle sensor 225. The rotor 219 is assembled to the motor housing 217 and the bearing housing 215. Referring to FIGS. 19–20, a portion 219FS of the female screw 221 of the rotor 219 with which the portion of the reciprocating shaft 211 with the coating layer 223a formed is engaged has the inner diameter larger than that of the other portions thereof by the thickness of the coating layer 223a, so that, after the female screw 221 solidifies and contracts, the end of the male screw 221 except the coating area 211CA, i.e. an effective male-screw portion thereof, is engaged with the portion 219FS of the female screw 221 without a needless clearance. Moreover, the female screw 221 of the rotor 219 is formed by using the reciprocating shaft 211, obtaining excellent engagement therewith regardless of dispersion of the machining accuracy of the reciprocating shaft 211, resulting in easy assembling work.

Figure 23:
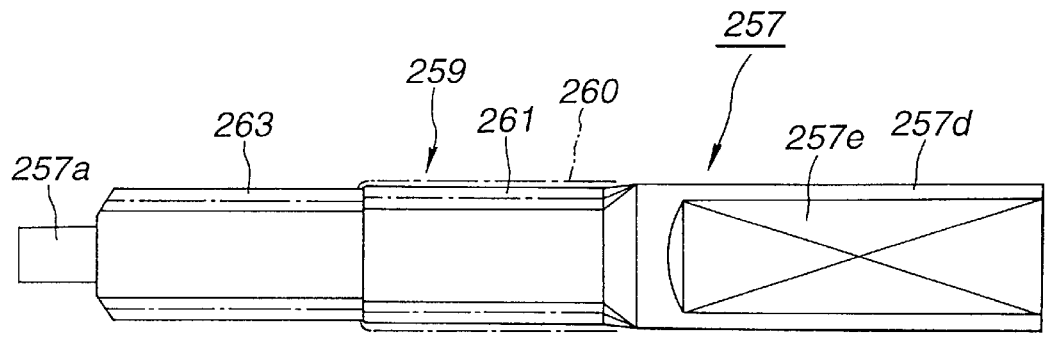
FIG. 23 is a view similar to FIG. 20, showing a fourth embodiment of the present invention.
Figure 24:
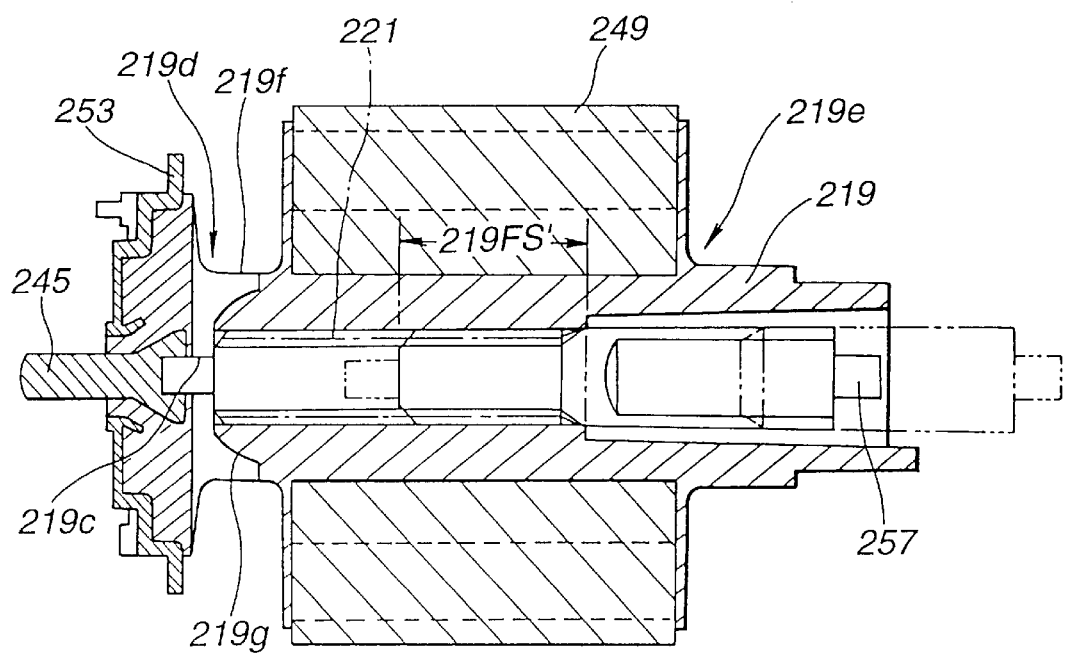
FIG. 24 is a view similar to FIG. 23, showing a rotor and a rotor core.

FIGS. 23–24 show a fifth embodiment of the present invention. As for the reciprocating shaft 211 in the fourth embodiment as shown in FIG. 16, the male screw 223 is partly covered with the coating layer 223a. On the other hand, as for a reciprocating shaft 257 in the fifth embodiment as shown in FIG. 23, a male screw 259 comprises a first male-screw portion 263 connected to a guide 257a, and a second male-screw portion 261 having the outer diameter larger than that of the first male-screw portion 263.

The reciprocating shaft 257 comprises the guide 257a engaged with the through hole 219c and the concavity 245a of the rotor support shaft 245, the male screw 259 engaged with the female screw 221 of the rotor 219, and a valve-element holder 257d having an end to which the valve element 209 is mounted. The valve-element holder 257d includes flat portions 257e formed to face each other. The flat portions 257e are in slide contact with a flat surface, not shown, formed in a portion of the bearing housing 215 through which the valve-element holder 257d of the reciprocating shaft 257 is arranged. This restrains rotation of the reciprocating shaft 257 in the same way as in the fourth embodiment.

The male screw 259 is formed, e.g. by rolling. The first and second male-screw portions 263, 261 include, e.g. a trapezoidal thread. The outer diameter of the second male-screw portion 261 is determined to be larger than that of the first male-screw portion 263 in accordance with the molding contraction coefficient of a molding material of the rotor 219. The axial length of the second male-screw portion 261 is determined to be substantially equal to or larger than that of the first male-screw portion 263 in accordance with the stroke length of the reciprocating shaft 257. Referring to FIG. 23, a layer 260 of lubricant such as grease containing molybdenum disulfide, graphite, lead oxide, or polytetrafluoroethylene is placed on the thread, groove, and flank of the second male-screw portion 261 by spraying as indicated by a one-dot chain line. The thickness of the lubricant layer 224 is, e.g. approximately 1 μm or less. Lubricant may be of the solid type containing boron oxide with lead oxide, molybdenum disulfide, or calcium fluoride. The lubricant layer 224 may be formed on the first male-screw portion 263.

Using the reciprocating shaft 257, an integration of the rotor 219 with the rotor core 249, the commutator 253 and the rotor support shaft 245, and a formation of the female screw 221 and the communication passage 219g in the rotor 219 are carried out as follows. First, the concavity 425a of the rotor support shaft 245 is engaged with the guide 257a of the reciprocating shaft 257. With the side of the commutator 253 which contacts the brushes 239A, 239B not facing the reciprocating shaft 257, the commutator 253 is disposed in a mold, not shown. Moreover, the rotor core 249 is disposed outside the reciprocating shaft 257 substantially in the middle thereof. Subsequently, a melted plastic material as a molding material is injected in a cavity of the mold and between the parts, which is then cooled for solidification. Thus, the rotor 219 having the commutator 253, the rotor support shaft 245 and the rotor core 249 integrated therewith can be obtained in the same way as in the fourth embodiment.

With the rotor 219 having the rotor core 249 with the coil 251 wound therearound being held, only the reciprocating shaft 257 is rotated as indicated by a two-dot chain line in FIG. 24 so that the concavity 245a of the rotor support shaft 245 is put in non-engagement with the guide 257a of the reciprocating shaft 257, and the portion with the second male-screw portion 261 is moved in the taper 219a of the rotor 219. Due to existence of the lubricant layer 260 formed on the second male-screw portion 261, the reciprocating shaft 257 can be moved by relatively small torque, resulting easy assembling work. Moreover, since lubricant is also placed on the female screw 221 of the rotor 219 engaged with the second male-screw portion 261 of the reciprocating shaft 257, lubrication can be ensured between the first male-screw portion 263 and the female screw 221 without providing lubricant. This results in elimination of a work of placing lubricant between the first male-screw portion 263 and the female screw 221.

The rotor 219 and the reciprocating shaft 257 assembled thereto are disposed in a predetermined position as shown in FIG. 17 in a space defined by the motor housing 217 and the bearing housing 215 which are preformed by injection molding together with the yokes 235, the magnets 237, and the rotational angle sensor 225. The rotor 219 is assembled to the motor housing 217 and the bearing housing 215. A portion 219FS' of the female screw 221 of the rotor 219 with which the second male-screw portion 261 of the reciprocating shaft 257 is engaged has the inner diameter larger than that of the other portions thereof, so that, after the female screw 221 solidifies and contracts, the first male-screw portion 263 of the male screw 223 is engaged with the portion 219FS' of the female screw 221 without a needless clearance. Moreover, the female screw 221 of the rotor 219 is formed by using the reciprocating shaft 257, obtaining excellent engagement therewith regardless of dispersion of the machining accuracy of the reciprocating shaft 257, resulting in easy assembling work.

In the fifth embodiment, the male screw 259 is formed by rolling, alternately, it may be formed by other method such as forging such as lost-wax process or die casting, etching, or sintering.

Figure 25:
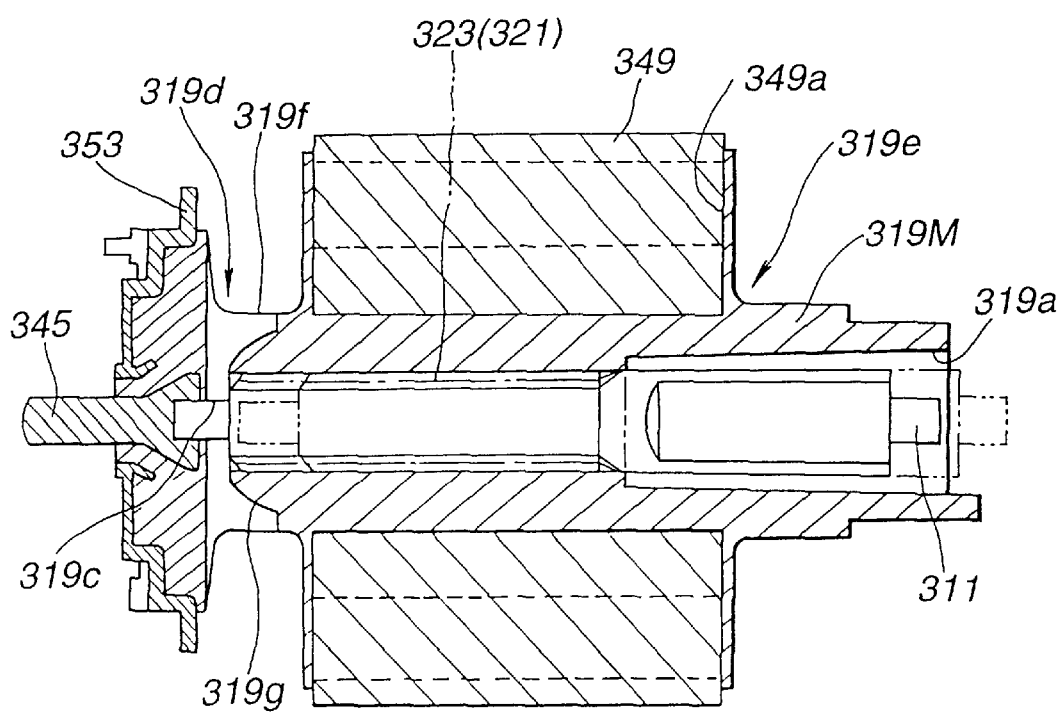
FIG. 25 is a view similar to FIG. 24, showing a fifth embodiment of the present invention.
Figure 26:
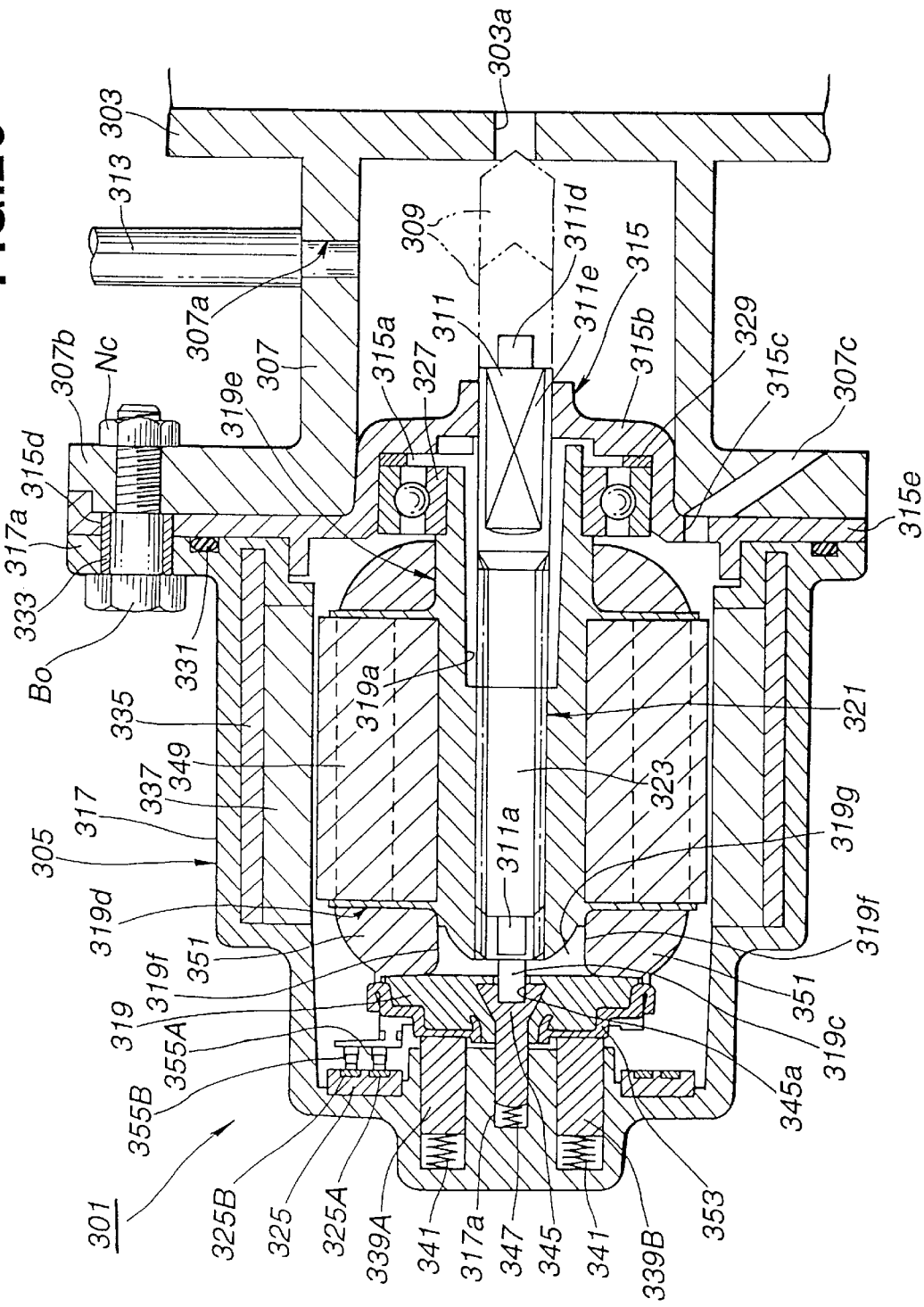
FIG. 26 is a view similar to FIG. 25, showing an exhaust-gas-recirculation control valve with an exhaust passage.

FIGS. 25–33 show a sixth embodiment of the present invention. Referring to FIG. 26, an exhaust-gas-recirculation control valve 301 comprises a cylindrical support 307 having one end connected to a wall of an exhaust passage 303 connected to an engine main body of a motor vehicle, not shown, on the exhaust side thereof so as to enclose an exhaust-gas outlet 303a, and an electric-motor main body 305 supported by another end of the cylindrical support 307 and including a reciprocating shaft 311 to which a valve element 309 is approachably/withdrawably arranged with respect to the exhaust-gas outlet 303a as indicated by one-dot and two-dot chain lines in FIG. 26.

A cylindrical portion of the cylindrical support 307 is formed with an exhaust-gas discharge port 307a connected to one end of a recirculation passage 313, another end of which is connected to a downstream portion of a throttle valve arranged in a suction passage and connected to the engine main body on the suction side thereof. Thus, when the valve element 309 takes a position distant from the exhaust-gas outlet 303a, exhaust gas is drawn into the cylindrical support 307 in accordance with a substantial opening area of the exhaust-gas outlet 303a, which is introduced into the recirculation passage 313 through the exhaust-gas discharge port 307a in accordance with a negative pressure within the suction passage.

The electric-motor main body 305 comprises a bearing housing 315 forming the front end, a motor housing 317 connected to the bearing housing 315 and forming the outline, a rotor 319 rotatably supported in the motor housing 317 and including therein a female screw 321, the reciprocating shaft 311 arranged in the rotor 319 and including a male screw 323 engaged with the female screw 321, and a rotational angle sensor 325 arranged in the motor housing 317 at the rear end thereof for sensing the rotational angle of the rotor 319.

The bearing housing 315 includes a protrusion 315b on the front surface thereof, which is engaged with the inner periphery of the cylindrical support 307, and a bearing receiver 315a in which a ball bearing 327 is press fitted through a wave washer 329. The ball bearing 327 serves to rotatably support the front end of the rotor 319. Moreover, the bearing housing 315 includes a flange 315e with a through hole 315c which communicates with the air through a communication passage 307c formed in the cylindrical support 307 at another end thereof. The inside of the bearing housing 315 thus communicates with the air through the through hole 315c and the communication passage 307c, allowing release of, e.g. warmed inside air to the outside.

Figure 27:
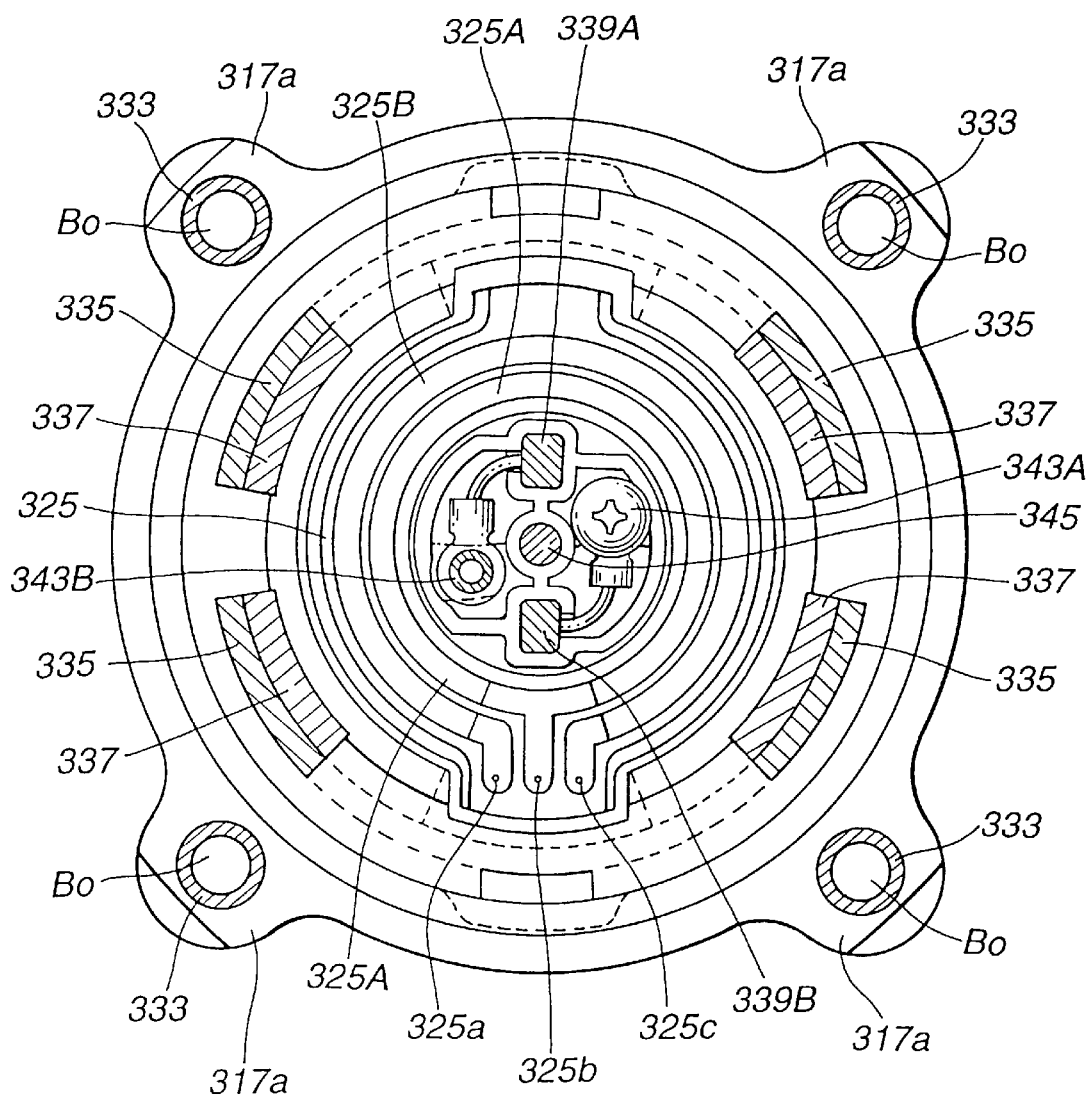
FIG. 27 is a view similar to FIG. 18, showing the exhaust-gas-recirculation control valve.

The bearing housing 315 has on the reverse side of the peripheral edge a protrusion engaged with the inner periphery of the motor housing 317. The front end face of the motor housing 317 contacts the bearing housing 315 through an O-ring 331. Referring to FIGS. 26–27, the motor housing 317 made of, e.g. a resin includes a flange 317a in which a collar 333 for receiving a bolt Bo is arranged to correspond to the through hole 315d of the bearing housing 315. The flange 317a is mounted to the cylindrical support 307 at another end thereof through the bolt Bo arranged in a through hole of the collar 333 and a through hole 307b formed in the cylindrical support 307 at another end thereof to correspond to the collar 333, and a nut Nc arranged at another end of the cylindrical support 307 to engage with the bolt Bo. As shown in FIG. 27, two substantially fan-shaped yokes 335 are oppositely arranged at the inner periphery of the motor housing 317, each yoke having the inner surface on which two magnets 337 with a circumferentially curved portion are arranged.

As shown in FIGS. 26–27, a pair of brushes 339A, 339B is arranged in the motor housing 317 in the center of the rear end thereof, and is biased forward by a biasing force of a coil spring 341 disposed in a concavity. The brush 339A is electrically connected to an input terminal 343B arranged at the rear end of the motor housing 317, whereas the brush 339B is electrically connected to an input terminal 343A arranged at the rear end of the motor housing 317.

The rotational angle sensor 325 for sensing the rotational angle of the rotor 319 is arranged in the motor housing 317 at the rear end thereof to enclose the brushes 339A, 339B. As shown in FIG. 27, the rotational angle sensor 325 comprises a first sensing element 325A shaped substantially in a ring, and a second sensing element 325B shaped substantially like the first sensing element 325A and arranged therearound. The first sensing element 325A is connected to an output terminal 325b for providing outside a sensed output, whereas both ends of the second sensing element 325B are connected to output terminals 325a, 325c for providing outside a sensed output, respectively.

The rotor 319 is made of, e.g. a plastic material such as a polyamide resin or a poly(phenylene sulfide) (PPS) resin, or a liquid crystal polymer. The rotor 319 may be made of other material such as a polypropylene resin. As shown in FIG. 26, the rotor 319 has the front end forming one end of a rotational shank thereof and rotatably supported by the ball bearing 327 as described above, and a rear end forming another end of the rotational shank and rotatably supported through one end of a rotor support shaft 345 engaged with a support hole 317a formed between the brushes 339A, 339B against a biasing force of a thrust washer 347, the rotor support shaft 345 being integrated with the rotor 319 to have an axis corresponding to that of the rotor 319. The rotor support shaft 345 has another end formed with a concavity 345a. A commutator 353 is integrated with the rotor 319 at the rear end thereof to contact end faces of the brushes 339A, 339B. Sensing brushes 355A, 355B are arranged to the commutator 353 on the side thereof opposite to the rotational angle sensor 325 to correspond to and contact the sensing elements 325A, 325B thereof.

Figure 30:
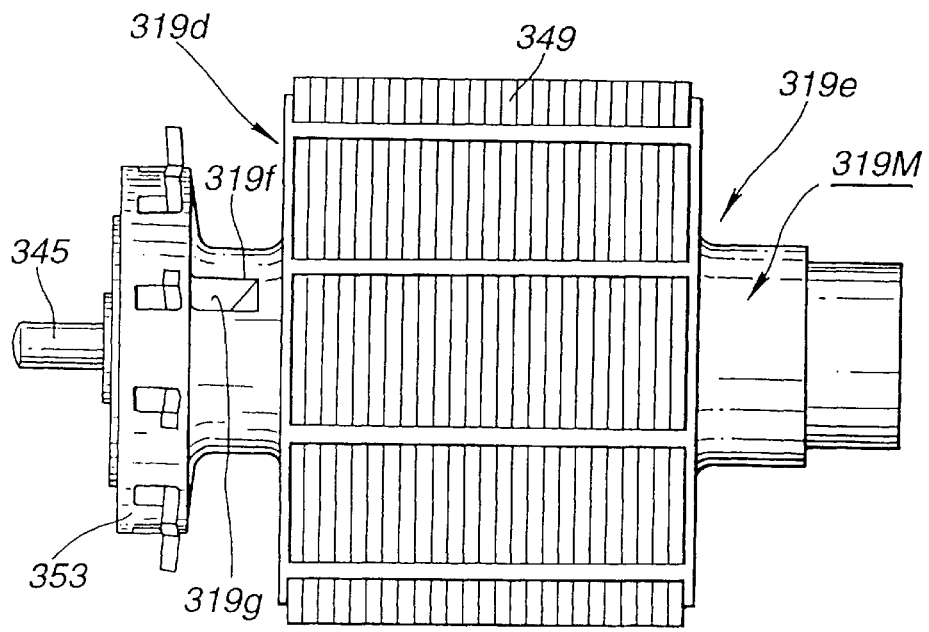
FIG. 30 is a view similar to FIG. 22, showing a rotor and a rotor core.

Arranged in a rotor-core receiving portion formed substantially in the middle of the outer periphery of the rotor 319 is a rotor core 349 around which a coil 351 is wound in accordance with the number of slots thereof. Ends of the coil 351 are electrically connected to stops of the commutator 353 arranged on the peripheral edge thereof. The rotor core 349 of the rotor 319 has both ends formed with coil assembling portions 319d, 319e in which the coil 351 is assembled. Formed inside the rotor 319 on the same axis are a taper 319a forming the end and having a predetermined inclination, a female screw 321 having the diameter smaller than the small diameter of the taper 319a, and a through hole 319c communicating with the concavity 345a of the rotor support shaft 345 and having the same diameter as that of the concavity 345a. Referring to FIGS. 26 and 30, a communication passage 319g is arranged to ensure communication between an inside space formed by the through hole 319c and the female screw 321 and an opening 319f formed in the coil assembling portion 319d of the rotor core 349 arranged at the rear end thereof.

Figure 31:
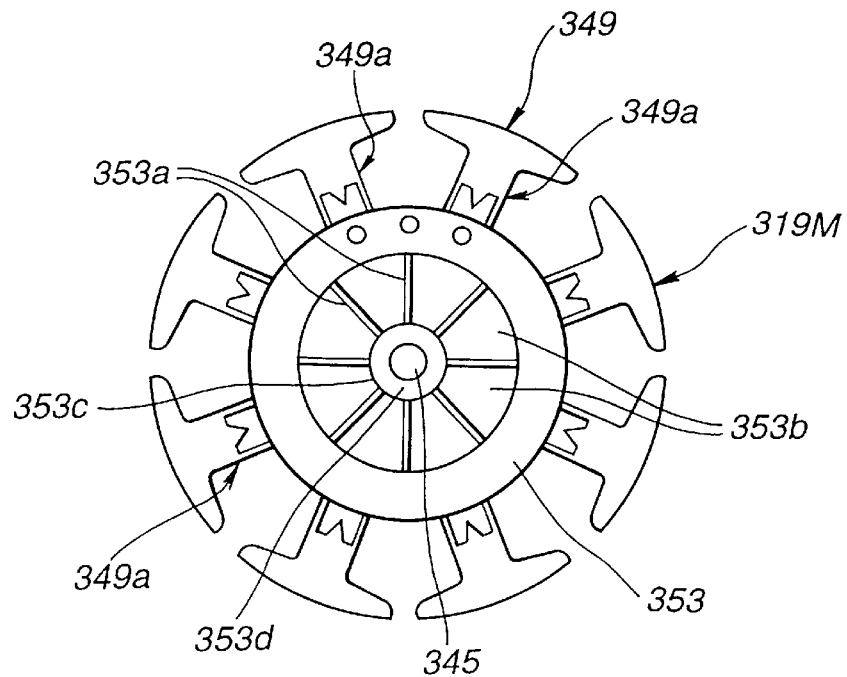
FIG. 31 is a view similar to FIG. 27, showing the rotor.

Thus, referring to FIG. 31, when the coil 351 is wound around the rotor core 349, the inside space formed by the female screw 321 and that of the motor housing 317 communicate with each other through the communication passage 319g and clearances between parts of the coil 351 assembled in the coil assembling portion 319d. Therefore, when the reciprocating shaft 311 is moved forward, air within the inside space of the motor housing 317 is sucked into the inside space formed by the female screw 321 through the communication passage 319g with floating dust, etc. eliminated by the coil 351. Moreover, sucked air serves to cool the coil 351. On the other hand, when the reciprocating shaft 311 is moved backward, air within the inside space formed by the female screw 321 is released through the communication passage 319g, obtaining smooth movement of the reciprocating shaft 311.

The female screw 321 of the rotor 319 includes, e.g. a trapezoidal thread having a predetermined pitch, and is engaged with an end and a middle of the male screw 323 of the reciprocating shaft 311.

The reciprocating shaft 311 is made of a metallic material such as stainless steel, and comprises a guide 311a engaged with the through hole 319c and the concavity 345a of the rotor support shaft 345, the male screw 323 engaged with the female screw 321, and a valve-element holder 311d having an end to which the valve element 309 is mounted. The valve-element holder 311d includes flat portions 311e having two faces formed to face each other. The flat portions 311e are in slide contact with a flat surface, not shown, formed in a portion of the protrusion 315b of the bearing housing 315 through which the valve-element holder 311d of the reciprocating shaft 311 is arranged. This restrains rotation of the reciprocating shaft 311.

Figure 28:
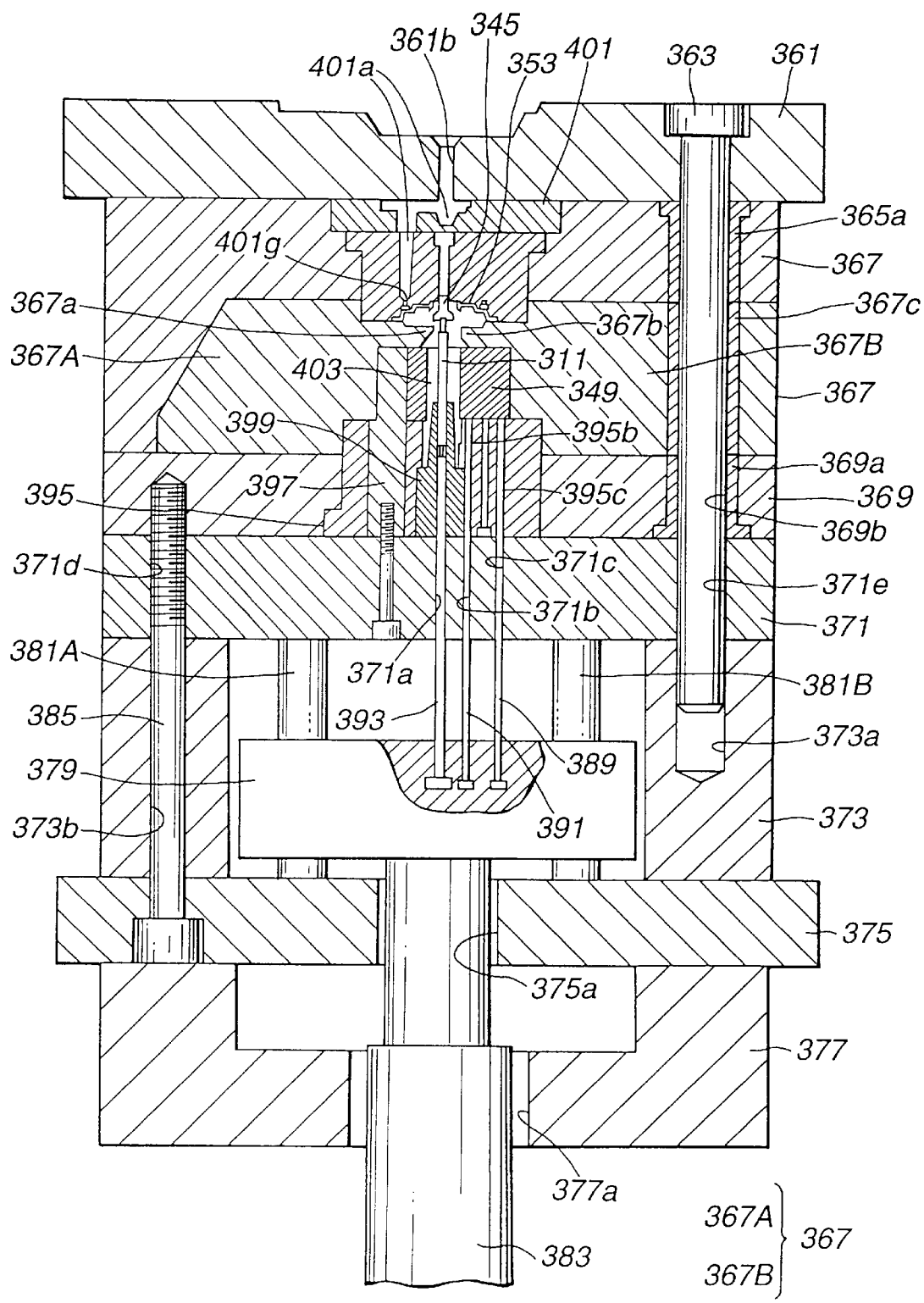
FIG. 28 is a sectional view showing an injection molding device.

In the sixth embodiment, a rotor member 319M (see, e.g. FIG. 31) including the rotor core 349, the commutator 353, and the rotor support shaft 345 integrated therewith is molded with an injection molding device, e.g. as shown in FIG. 28.

Referring to FIG. 28, the injection molding device comprises a stationary die plate 361 including a nozzle 361a to which a melted plastic material is supplied from an injection device, not shown, a movable die plate 375 disposed to face the stationary die plate 361 and supported by a mold clamping ram 377 connected to a mold clamping cylinder, not shown, and molds 365, 367, 369 disposed between the stationary die plate 361 and the movable die plate 375.

Arranged to the movable die plate 375 on one end face thereof is an annular base 373 having a bottomed hole 373a for receiving a pair of guide rods 363 (one of which is seen in FIG. 28) which protrude from one end of the stationary die plate 361 to the movable die plate 375. Arranged to the base 373 on one end face thereof is a mold support plate 371 having a through hole 371e for receiving the guide rods 363 and supporting the mold 369 as described later. An extruding plate 379 is arranged in the base 373, and is connected to one end of a rod 383 protruding from the mold support plate 371 through a through hole 377a of the mold clamping ram 377 and a through hole 375a of the movable die plate 375. The extruding plate 379 is slidably supported by guide rods 381A, 381B for connecting one end face of the movable die plate 375 and one end face of the mold support plate 371. The extruding plate 379 includes pins 393, 391, 389 which serve to press, when removing from the mold 369 the rotor 319 molded, ends of the reciprocating shaft 311 and the rotor core 349 of the rotor 319 in accordance with movement of the rod 383.

The pin 393 extends to the inside of a mold 399 arranged in the mold 369 through the through hole 371a of the mold support plate 371 so as to be substantially parallel to the guide rod 363. The pin 391 extends to one end face of a mold 395 through a through hole 371b of the mold support plate 371 and a through hole 395b of the mold 395 arranged in the mold 369 so as to be substantially parallel to the pin 393. The pin 389 extends to one end of the mold 395 through a through hole 371c of the mold support plate 371 and a through hole 395c of the mold 395 arranged in the mold 369 so as to be substantially parallel to the pin 391. Thus, when the movable die plate 375 takes a position distant from the stationary die plate 361, the extruding plate 379 is moved to the stationary die plate 361 in accordance with movement of the movable die plate 375. Therefore, the reciprocating shaft 311 and the rotor core 349 of the rotor 319 molded are pressed out by the ends of the pins 393, 389, 391.

The mold 369 is fixed to the mold support plate 371 on another end face thereof by engagement of a bolt 385 connecting the movable die plate 375 and the mold 369 through the through holes 373b, 371d with a female screw of the mold 369. A guide rod 363 is arranged through the mold 369 through a collar 369a. The mold 369 includes the mold 395 for forming the inner periphery of the coil assembling portion 319e. The mold 369 has a surface formed with a concavity having a predetermined depth, and contacting through the concavity an end face of the rotor core 349 integrated with the rotor 319. The mold 399 is fixed to the mold 395 in the center of the inside, and includes a taper protrusion for forming the taper 319a of the rotor 319, and an inner passage for receiving ends of the reciprocating shaft 311 and the pin 393. The mold 395 further includes molds 397 disposed parallel to the mold 399 and arranged in slots 349a (see, e.g. FIGS. 25 and 31) of the rotor core 349 along the pin 393.

Figure 29:
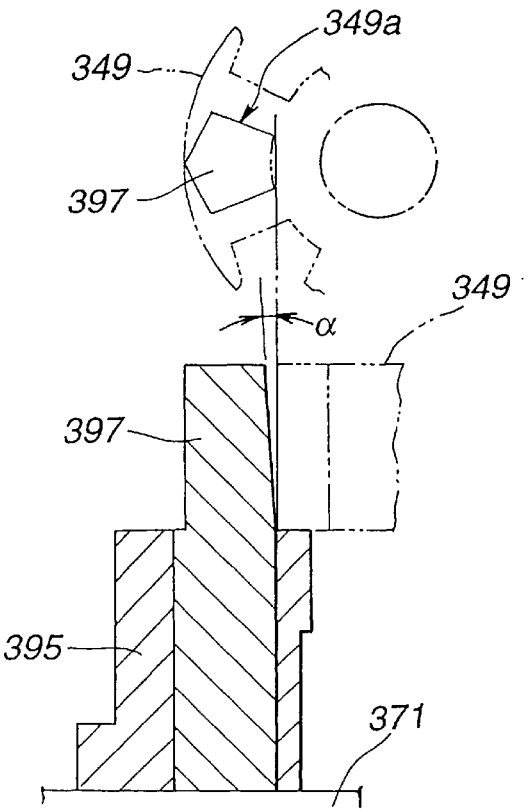
FIG. 29 is an enlarged fragmentary view of FIG. 28.

Referring to FIG. 29, the molds 397 have a substantially pentagonal cross section, and correspond to the eight slots 349a arranged in the circumferential direction of the rotor core 349. Each mold 397 has a portion arranged in the slot 349a and having sides inclined inward by a predetermined inclination α. This forms a predetermined clearance between the inner periphery of the slot 349a of the rotor core 349 and the outer periphery of the mold 397.

The mold 367 is disposed to the mold 369 on one end face thereof. The mold 367 comprises a mold 367A including a protrusion 367a for forming the inner periphery of the communication passage 319g of the rotor 319 by enclosing an end of the mold 395 and the rotor core 349 disposed upon molding, and a mold 367B including a protrusion 367b for forming the inner periphery of the coil assembling portion 319d of the rotor 319 by enclosing the end of the mold 395 and the rotor core 349 disposed upon molding. The molds 367A, 367B are arranged to mutually be approachable/withdrawable in the direction perpendicular to the guide rod 363 by a drive unit, not shown. The guide rod 363 is arranged through the mold 367 through the collar 367c.

The mold 365 is disposed to the mold 367 on an end face thereof reverse to the end face contacting the surface of the mold 369. The mold 365 includes therein a mold 401 in which the commutator 353 and the rotor support shaft 345 are arranged upon molding. The mold 410 has an introduction passage 401a which communicates with the nozzle 361a of the stationary die plate 361 to introduce a melted plastic material into the molds 365, 367, 369. A gate 401g is formed between the introduction passage 401g and the vicinity of a concavity 401b where the commutator 353 of the mold 401 is disposed. Thus, the inner periphery of the mold 395 of the mold 369, the outer periphery of the mold 399, the protrusion 367a of the mold 367A, the protrusion 367b of the mold 367B, and the concavity 401b of the mold 401 cooperate with each other to define a space or cavity 403 for receiving a melted plastic material.

When forming the rotor member 319M, the movable die plate 375 is moved along a support, not shown, to be distant from the stationary die plate 361, and the molds 367A, 367B are disposed to be distant from each other. The rotor core 349 is positioned by the mold 397, and is disposed on the end face of the mold 395. The commutator 353 and the rotor support shaft 345 are disposed in the concavity 401b of the mold 401. With the guide 311a engaged with the rotor support shaft 345, the reciprocating shaft 311 is disposed inside the rotor core 349 and at the inner periphery of the mold 399. This allows appropriate setting of the axial position of the rotor core 349, and the positions of the commutator 353 and the rotor support shaft 345 in the rotor 319 to be molded.

Then, the movable die plate 375 is moved by the mold clamping cylinder along the support to be near to the stationary die plate 361, and the molds 367A, 367B are disposed to be near to each other, engaging the molds 365, 367, 369 with each other.

Under a predetermined clamping force given by the mold clamping cylinder, a melted plastic material as a molding material is injected into the cavity 403, and clearances between the parts and the molds, which is then cooled for solidification.

Subsequently, the movable die plate 375 is moved again along the support so as to be distant from the stationary die plate 361, and the molds 367A, 367B are disposed to be distant from each other. And, the rotor core 349 and the reciprocating shaft 311 are pressed out by the ends of the pins 393, 389, 391 in accordance with the extruding plate 379. Thus, referring to FIGS. 25 and 30, the rotor member 319M is obtained, including the reciprocating shaft 311, the commutator 353, the rotor support shaft 345, and the rotor core 349 integrated therewith.

Figure 32:
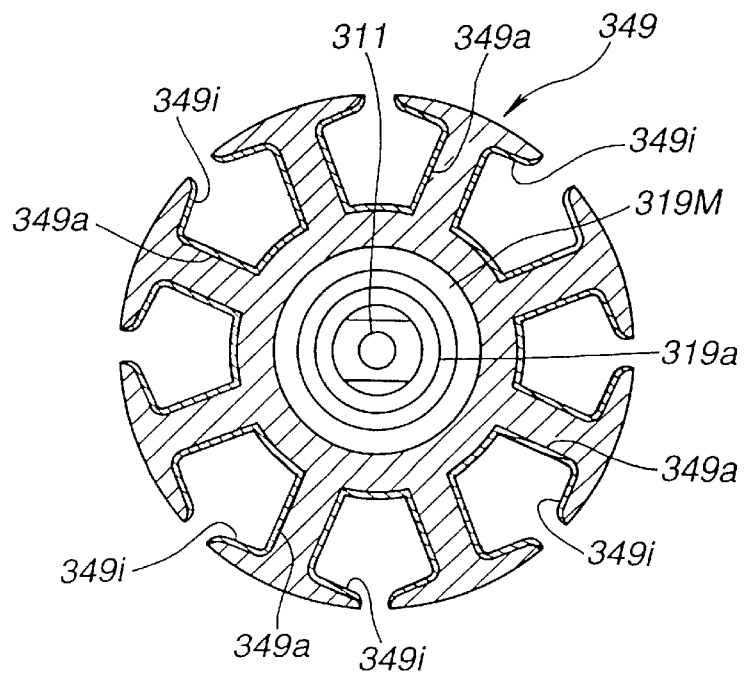
FIG. 32 is a cross section showing the rotor.
Figure 33:
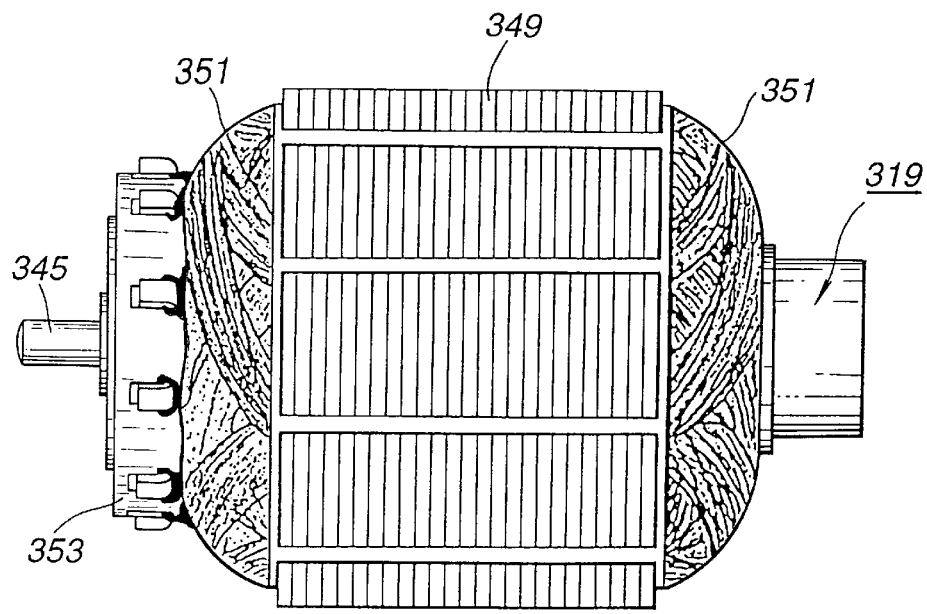
FIG. 33 is a view similar to FIG. 30, showing the rotor and the rotor core with a coil.

Referring to FIG. 31, the commutator 353 of the rotor member 319M has eight radial connectors 353a and a ring 353c arranged at one end thereof. Eight fan-shaped divisions 353b are disposed as insulators between the eight radial connectors 353a. A ring 353d is disposed as an insulator between the outer periphery of the rotor support shaft 345 and the inner periphery of the ring 353c. Referring to FIGS. 25 and 32, the inner periphery of the slots 349a and both ends of the rotor core 349 are covered with a coating layer 348i as an insulator. Referring to FIG. 33, the coil 351 is wound around the rotor core 349 of the rotor member 319M to be in the slots 349a, obtaining the rotor 319.

Thus, the rotor 319 is obtained, including the reciprocating shaft 311, the commutator 343, the rotor support shaft 345, and the rotor core 349 integrated therewith, which allows elimination of an insulating work due to formation of the coating layer 349i on the inner periphery of the slots 349a.

Referring to FIG. 25, with the rotor 319 with the coil 351 wound therearound being held, only the reciprocating shaft 311 is rotated as indicated by a two-dot chain line so that the concavity 345a of the rotor support shaft 345 is put in non-engagement with the guide 311a of the reciprocating shaft 311, and the portion of the male screw 323 in the vicinity of the valve-element holder 311d is moved in the taper 319a of the rotor 319 to be in non-engagement therewith.

Moreover, the motor housing 317 and the bearing housing 315 are prepared, which are preformed by injection molding together with the yokes 135, the magnets 137, and the rotational angle sensor 325. The female screw 321 of the rotor 319 and the male screw 323 of the reciprocating shaft 311 having the end engaged therewith are disposed in a space defined by the motor housing 317 and the bearing housing 315 in a predetermined position as shown in FIG. 26. Thus, assembling of the rotor 319 in the electric-motor main body 305 is completed.

Figure 34:
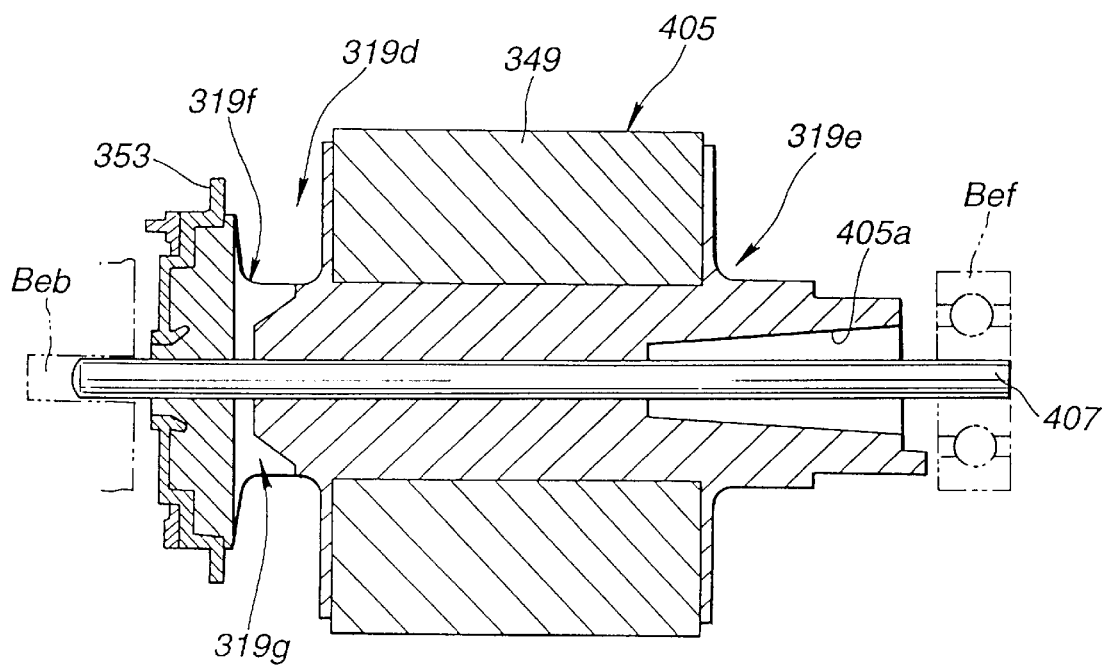
FIG. 34 is a view similar to FIG. 26, showing a sixth embodiment of the present invention.
Figure 35:
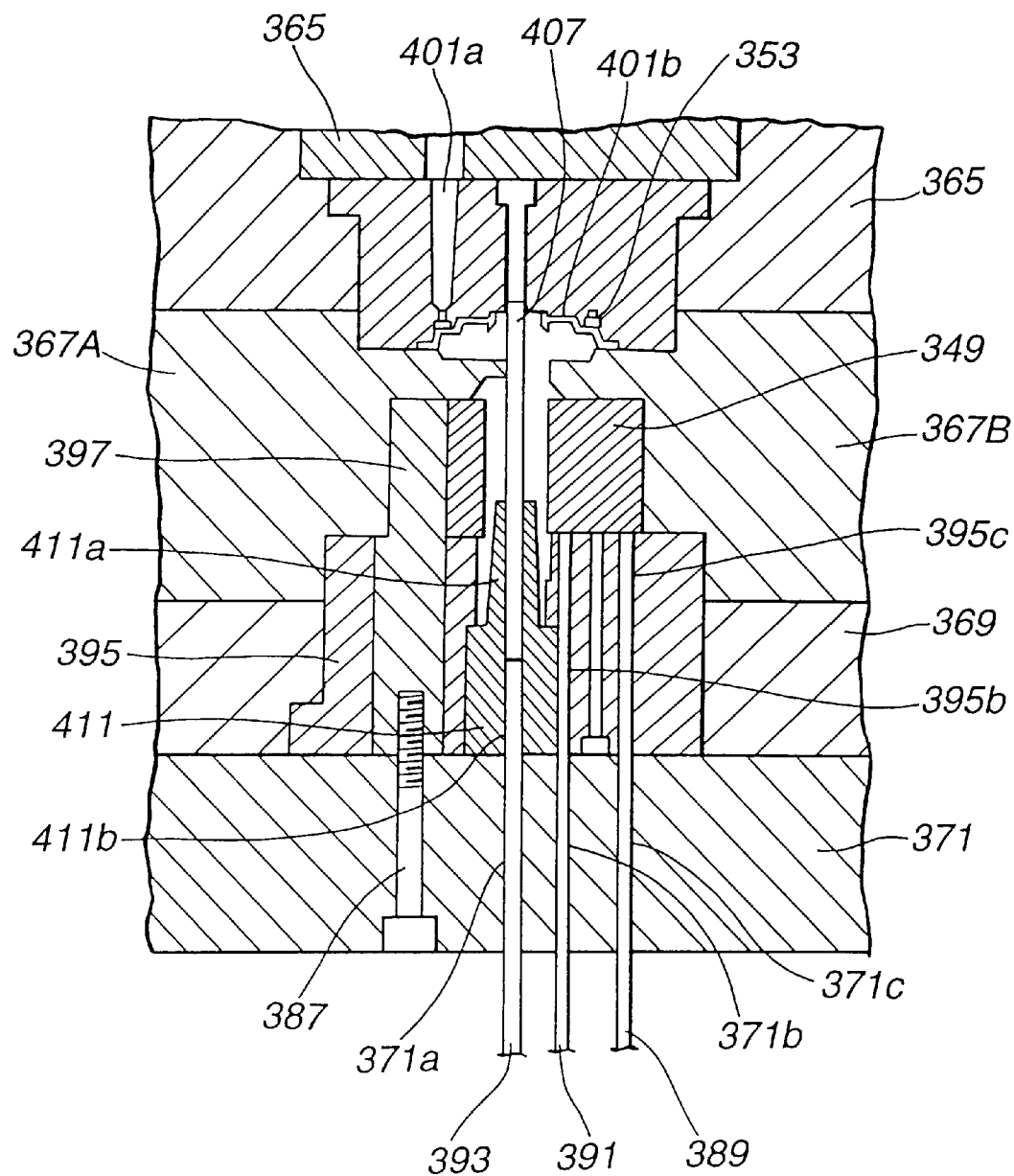
FIG. 35 is a view similar to FIG. 28, showing an injection molding device.

FIGS. 34–35 show a seventh embodiment of the present invention which is substantially the same as the sixth embodiment except that a rotor member 405 comprises a rotation shaft 407 coaxially integrated with the rotor core 349 in the inner portion. Remind that, in the sixth embodiment as shown in FIG. 25, the reciprocating shaft 311 is disposed inside the rotor core 349, whereas the rotor member 319M is rotatably supported with one end or the rotor support shaft 345 engaged with the concavity 317a, and another end engaged with the ball bearing 327.

Referring to FIG. 34, the rotor member 405 comprises the rotation shaft 407 having one end rotatably supported by a support hole of a bearing Beb of the motor housing 317, and another end engaged with rotatably supported by an inner race of a ball bearing Bef of the bearing housing 315. A taper 405a having a predetermined draft is axially formed to the rotor member 405 on the inner periphery on the side from which another end of the rotation shaft 407 protrudes.

The rotor member 405 is molded with an injection molding device as shown in FIG. 35. Referring to FIG. 35, arranged in the mold 395 in the center is a mold 411 including a protrusion 411a for forming the taper 405a of the rotor member 405. The mold 411 further includes an inner periphery 411b for receiving the rotation shaft 407 and an end of the pin 393. The rotation shaft 407 has one end positioned by contacting a concavity 401b of a mold 401, and another end positioned by contacting an end of the pin 393. The same processes as those in the sixth embodiment are successively carried out to obtain the rotor member 405. Thus, the seventh embodiment produces the same effect as that of the sixth embodiment.

Figure 36:
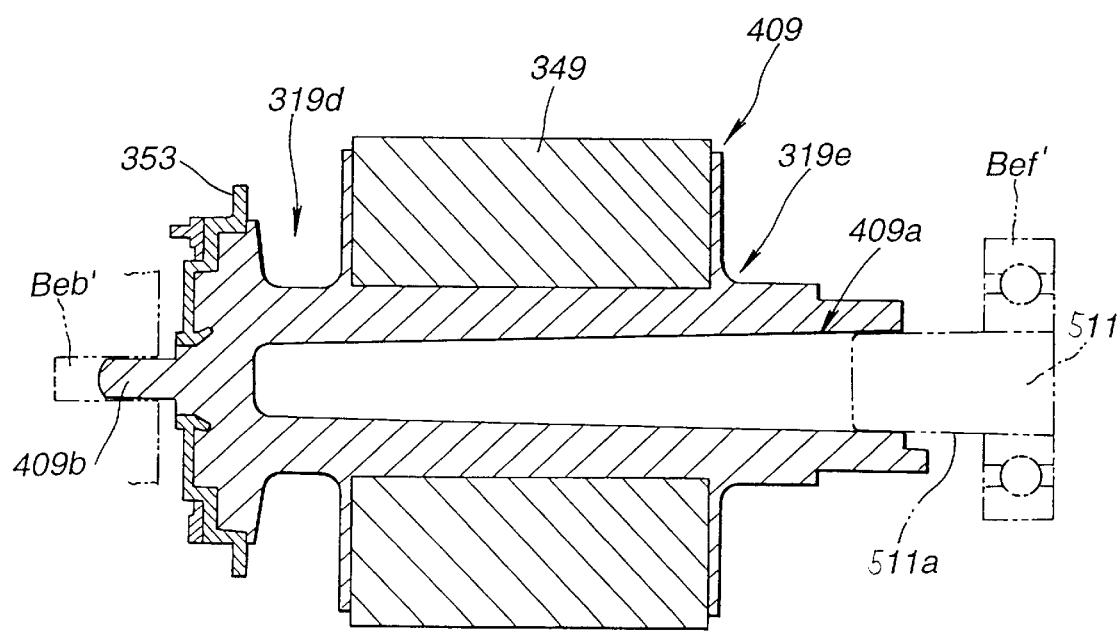
FIG. 36 is a view similar to FIG. 34, showing a seventh embodiment of the present invention.
Figure 37:
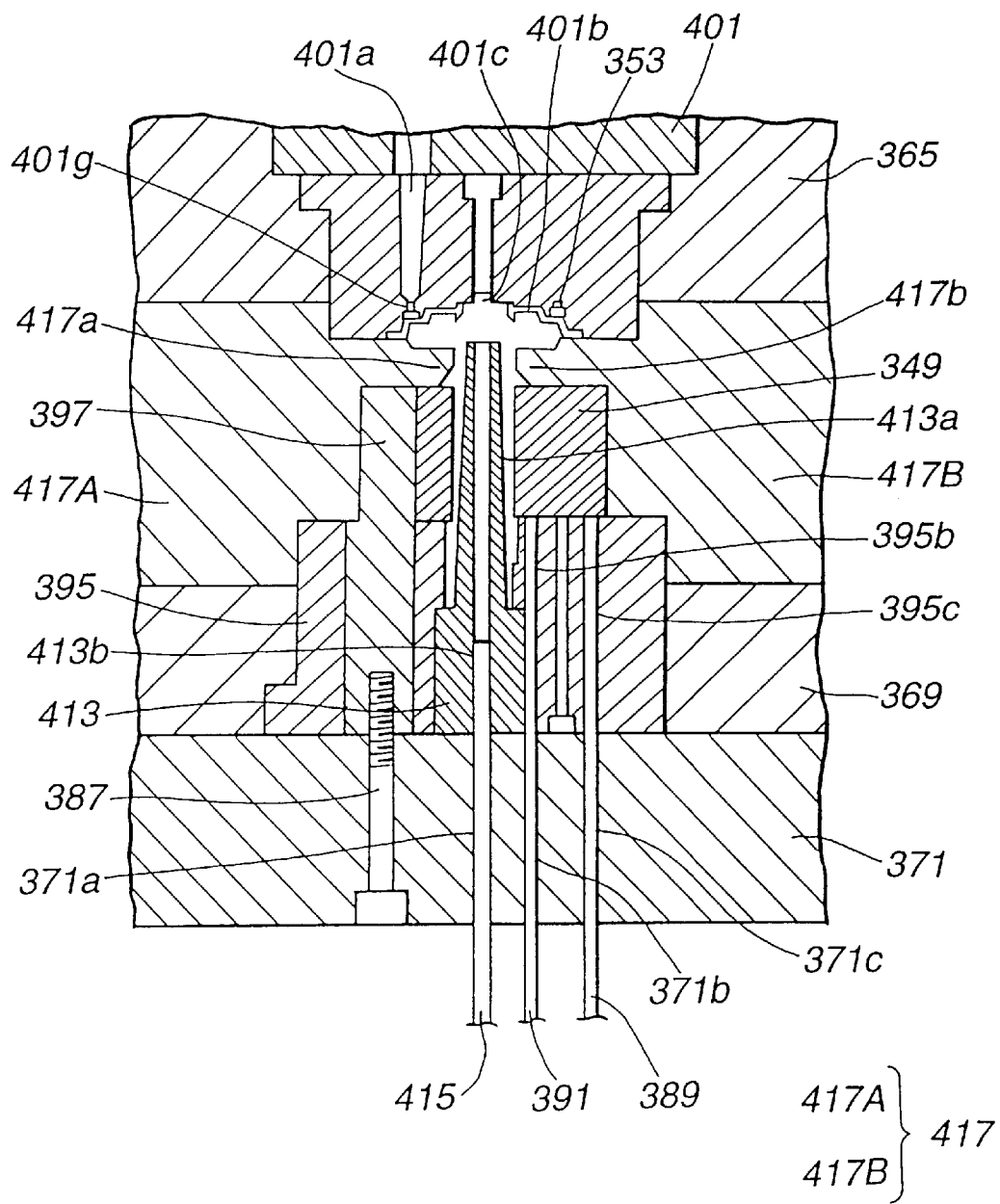
FIG. 37 is a view similar to FIG. 35, showing an injection molding device.

FIGS. 36–37 show an eighth embodiment of the present invention which is substantially the same as the sixth embodiment except that a rotor member 409 comprises a support shaft 409b made of a plastic material and integrated with the rotor core 349 coaxially and with the commutator 353 at an end thereof.

Referring to FIG. 36, the rotor member 409 has one end or an end of the support shaft 409b rotatably supported by a support hole of a bearing Beb' of the motor housing 317, and another end rotatably supported through a rotation shaft 511 engaged with an inner race of a ball bearing Bef' of the bearing housing 315. A taper 511a is formed to the rotation shaft 511 at an end thereof. Moreover, a taper 409a is axially formed to the rotor member 409 on the inner periphery to have a predetermined draft corresponding to the taper 511a of the rotation shaft 511 for engagement therewith.

The rotor member 409 is molded with an injection molding device as shown in FIG. 37. Referring to FIG. 37, arranged in the mold 395 in the center is a mold 413 including a protrusion 413a for forming the taper 409a of the rotor member 409. The mold 413 further includes an inner periphery 413b for receiving an end of a pin 415. A concavity 401c is arranged in the center of the concavity 401b of the mold 401 to form the support shaft 409b.

A mold 417 is arranged around the mold 395. The mold 417 comprises a mold 417A having a protrusion 417a for forming the inner periphery of the coil assembling portion 319d of the rotor member 409 by enclosing the end of the mold 395 and the rotor core 349, and a mold 417B having a protrusion 417b for forming the inner periphery of the coil assembling portion 319d of the rotor member 409 by enclosing the end of the mold 395 and the rotor core 349. The commutator 353 is axially positioned with respect to the rotor core 349 by disposing the mold 401 in the concavity 401b. The same processes as those in the sixth embodiment are successively carried out to obtain the rotor member 409. Thus, the eighth embodiment produces the same effect as that of the sixth embodiment.

It is noted that the present invention is applicable not only to the electric motor as described in the embodiments, but to electric motors of the other rotary type.

What is claimed is:

1. A feed-screw unit comprising:
   a rotatable rotor formed with a female screw; and
   a reciprocating shaft disposed inside said rotor, said reciprocating shaft being reciprocable in an axial direction of said rotor in response to the rotor rotation, said reciprocating shaft having a male screw with a first screw portion that engages said female screw and a second screw portion that does not engage said female screw,
   wherein said second screw portion has an outer diameter larger than that of said first screw portion.

2. A feed-screw unit as claimed in claim 1, wherein said second screw portion includes a coating layer placed thereon.

3. A feed-screw unit as claimed in claim 2, wherein said coating layer is produced by one of electroplating, immersion coating, spraying, injection molding, and application of a heat contracting member.

4. A feed-screw unit as claimed in claim 3, wherein said coating layer has a thickness determined in accordance with a molding characteristic of a material of said rotor.

5. A feed-screw unit as claimed in claim 1, wherein said first screw portion includes an effective engagement tapered area having a predetermined axial inclination.

6. A feed-screw unit as claimed in claim 1, wherein said male screw of said reciprocating shaft includes a lubricant layer placed at least on said second portion thereof.

7. A feed-screw unit as claimed in claim 1, wherein said rotor is made of a plastic material.

8. A feed-screw unit as claimed in claim 1, wherein said rotor is made of a metallic material.

9. An electric motor comprising:
   a rotatable rotor formed with a female screw;
   a reciprocating shaft disposed inside said rotor, said reciprocating shaft being reciprocable in an axial direction of said rotor in response to the rotor rotation, said reciprocating shaft having a male screw with a first screw portion that engages said female screw and a second screw portion that does not engage said female screw, wherein said second screw portion has an outer diameter larger than that of said first screw portion;
   a casing including bearings for rotatably supporting of ends of said rotor and magnets disposed on an inner periphery thereof; and
   a rotor core disposed on an outer periphery of said rotor facing said magnets, said rotor core including a coil wound therearound.

10. An electric motor as claimed in claim 9, wherein said rotor core has a coil assembling portion with an opening and a passage for ensuring air flow between a space defined by said female screw and said opening of said coil assembling portion.

* * * * *